(12) United States Patent
Sakamoto et al.

(10) Patent No.: US 10,176,590 B2
(45) Date of Patent: Jan. 8, 2019

(54) IMAGE PROCESSING APPARATUS, IMAGE PROCESSING METHOD, AND NON-TRANSITORY COMPUTER READABLE STORAGE MEDIUM

(71) Applicant: Yahoo Japan Corporation, Tokyo (JP)

(72) Inventors: Ryuuki Sakamoto, Tokyo (JP); Shinichi Higashino, Tokyo (JP)

(73) Assignee: YAHOO JAPAN CORPORATION, Tokyo (JP)

(*) Notice: Subject to any disclaimer, the term of this patent is extended or adjusted under 35 U.S.C. 154(b) by 5 days.

(21) Appl. No.: 15/432,574

(22) Filed: Feb. 14, 2017

(65) Prior Publication Data

US 2017/0270683 A1    Sep. 21, 2017

(30) Foreign Application Priority Data

Mar. 16, 2016   (JP) .................... 2016-052486

(51) Int. Cl.
*G06T 7/60* (2017.01)
*G06T 7/80* (2017.01)
*G06T 15/20* (2011.01)
*G06T 7/73* (2017.01)

(52) U.S. Cl.
CPC .............. *G06T 7/60* (2013.01); *G06T 7/74* (2017.01); *G06T 7/80* (2017.01); *G06T 15/205* (2013.01); *G06T 2207/10016* (2013.01); *G06T 2207/20048* (2013.01); *G06T 2207/20088* (2013.01); *G06T 2207/20221* (2013.01); *G06T 2207/30204* (2013.01); *G06T 2207/30244* (2013.01)

(58) Field of Classification Search
CPC ... G06T 7/60; G06T 7/80; G06T 2207/30244; G06T 2207/20088; G06T 2207/20048; G06T 2207/20221; G06T 2207/30204
See application file for complete search history.

(56) References Cited

FOREIGN PATENT DOCUMENTS

| JP | 2003-515829 A | 5/2003 |
|---|---|---|
| JP | 2004-139294 A | 5/2004 |
| JP | 2007-286715 A | 11/2007 |
| JP | 2014-082678 A | 5/2014 |
| JP | 2014-239384 A | 12/2014 |
| JP | 2015-127903 A | 7/2015 |

OTHER PUBLICATIONS

Ando, an English machine translation of JP2014-082678, 2014.*

(Continued)

*Primary Examiner* — Ruiping Li
(74) *Attorney, Agent, or Firm* — Oliff PLC

(57) ABSTRACT

An image processing apparatus according to the present application includes a reception unit and a specification unit. The reception unit receives image data produced through image capturing by a predetermined image capturing apparatus and including an elliptical figure. The specification unit performs projection transform of the image data so that the elliptical figure included in the image data received by the reception unit appears to be an exact circle, and specifies, based on characteristic information on the exact circle obtained through the projection transform, the exact circle to be a marker used in predetermined processing on the image data.

12 Claims, 14 Drawing Sheets

(56) References Cited

OTHER PUBLICATIONS

Abed et al, "Camera Calibration Using Two Concentric Circles", ICIAR, 2004.*
Yato et al. "Marker Recognition and Orientation Estimation by Local Features for Mixed Reality System." Information Processing Society of Japan, Symposium Image Recognition and Understanding Symposium (MIRU) 2011, Japan pp. 1S3-44:1161-1S3-44:1168.
Katahira et al. "Location Identification by hybrid sensing." Information Processing Society of Japan, Study Report, Japan. pp. 185-192.
Mar. 21, 2017 Office Action issued in Japanese Patent Application No. JP2016-052486.

* cited by examiner

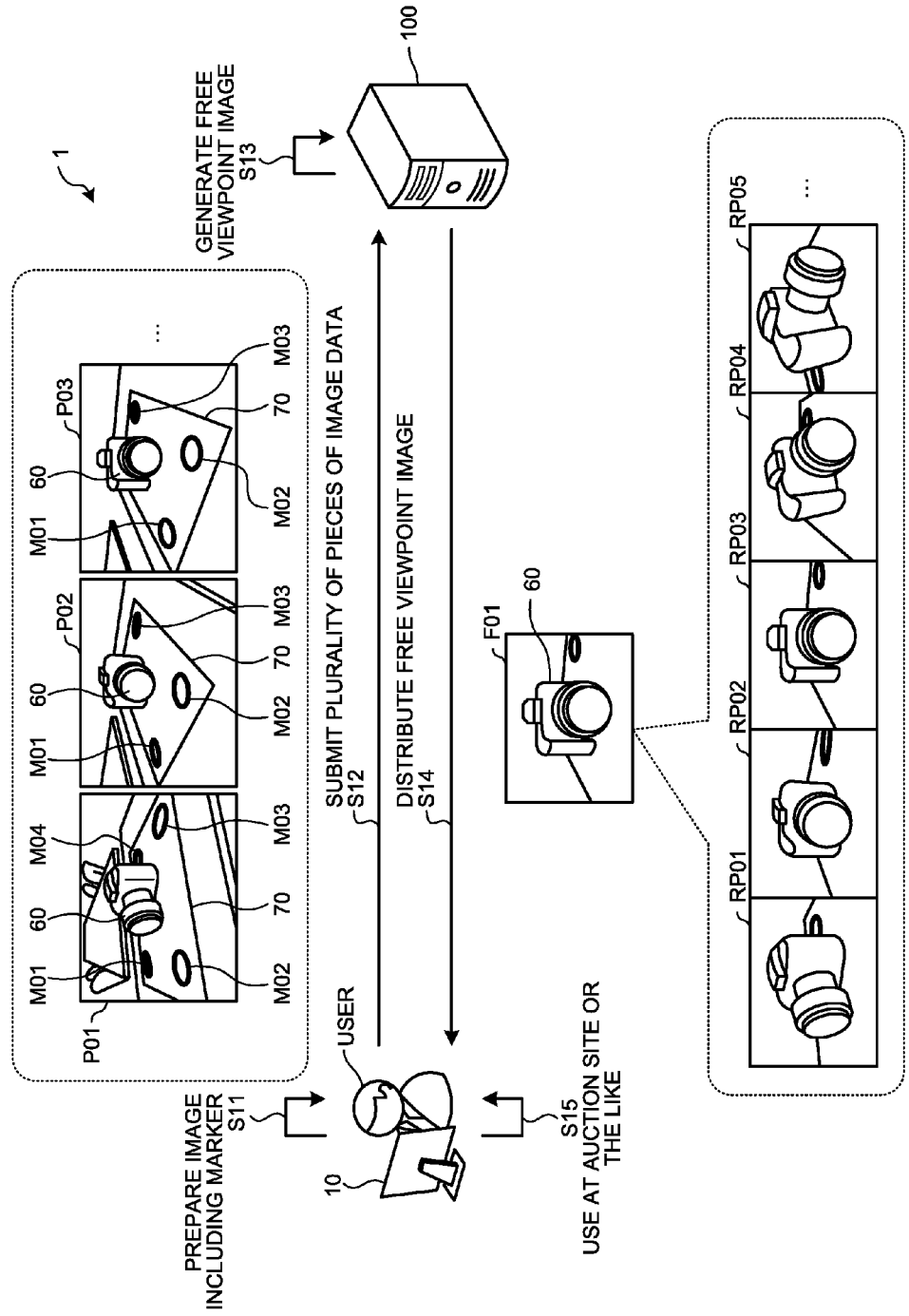

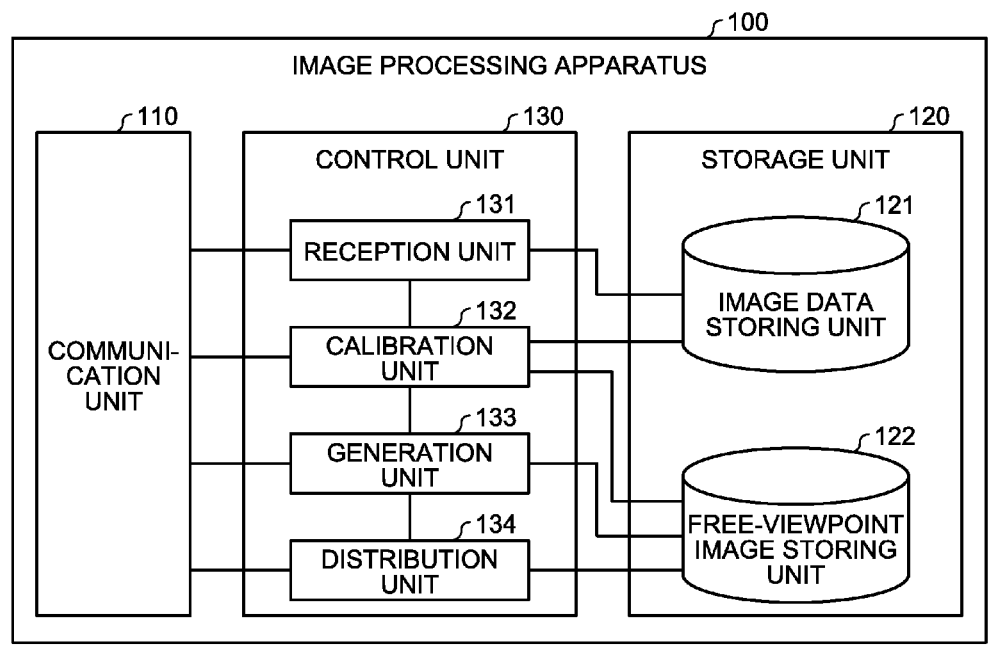

FIG.4

| FREE VIEWPOINT IMAGE ID | ORIGINAL IMAGE DATA | CALIBRATION DATA | CONVERTED IMAGE DATA | INITIAL DISPLAY SCREEN | |
|---|---|---|---|---|---|
| ⋮ | ⋮ | ⋮ | ⋮ | ⋮ | ⋮ |
| F01 | P01 | R01 | RP01 | | |
| | P02 | R02 | RP02 | | |
| | P03 | R03 | RP03 | RP03 | |
| | P04 | R04 | RP04 | | |
| | P05 | R05 | RP05 | | |
| | ⋮ | ⋮ | ⋮ | ⋮ | |
| ⋮ | | | | ⋮ | ⋮ |

122

| MARKER ID | CHARACTERISTIC INFORMATION | ... |
|---|---|---|
| M01 | L01 | ... |
| M02 | L02 | ... |
| M03 | L03 | ... |
| M04 | L04 | ... |
| ... | ... | ... |

FIG.15
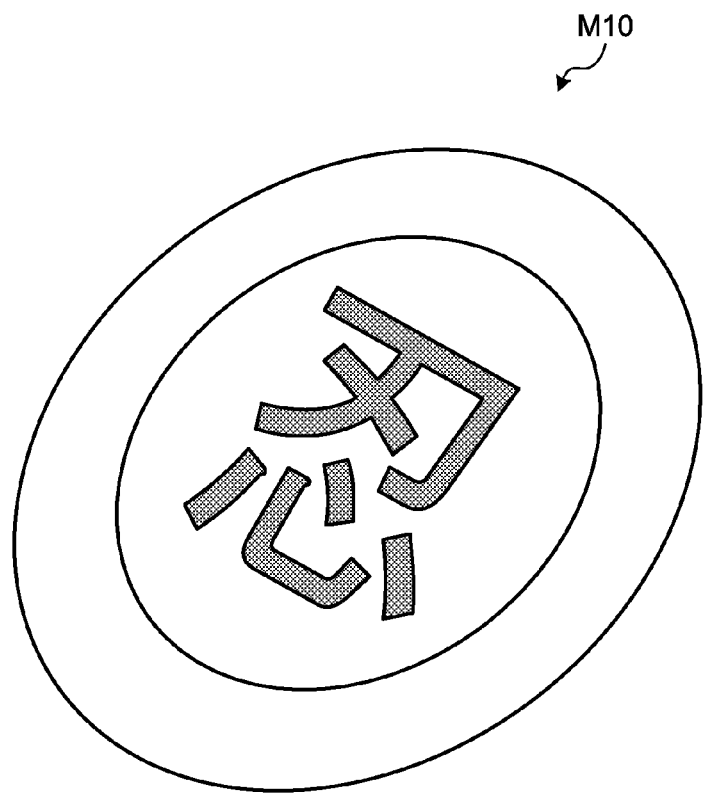
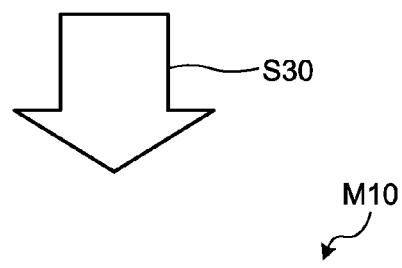
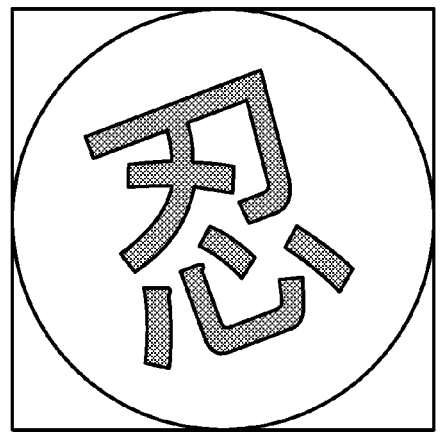

IMAGE PROCESSING APPARATUS, IMAGE PROCESSING METHOD, AND NON-TRANSITORY COMPUTER READABLE STORAGE MEDIUM

CROSS-REFERENCE TO RELATED APPLICATION(S)

The present application claims priority to and incorporates by reference the entire contents of Japanese Patent Application No. 2016-052486 filed in Japan on Mar. 16, 2016.

BACKGROUND OF THE INVENTION

1. Field of the Invention

The present invention relates to an image processing apparatus, an image processing method, and a non-transitory computer readable storage medium having stored therein an image processing program.

2. Description of the Related Art

Conventionally, an image capturing technology called, for example, time slice or bullet time has been known. In this image capturing technology, a plurality of image capturing apparatuses (for example, cameras) are arranged around an image capturing target (for example, an object such as a person). Specifically, the image capturing apparatuses are arranged such that the optical axis of each image capturing apparatus passes through a predetermined one point of the image capturing target, and capture images of the object. An image generated by connecting image data captured by this image capturing technology is called, for example, a free viewpoint image. A user can select an optional viewpoint for the free viewpoint image, which allows visual recognition of the object at various angles. For example, when used for, for example, promotion, a free viewpoint image is likely to achieve a promotion effect stronger than that achieved by a normal image.

In a known technology (for example, Japanese Patent Application Laid-open No. 2007-286715) related to image capturing of an object, the object is recognized through image capturing when the object is on a sheet on which a marker as a feature point is printed. Literature of the conventional technology discloses that feature-point display medium information as information on a marker is recorded on the marker and specified through image recognition, which allows optional change of a condition in which the marker is used. For example, a method of processing of generating a free viewpoint image is disclosed as a technology related to a free viewpoint image (for example, Japanese Patent Application Laid-open No. 2014-239384 and Japanese Patent Application Laid-open No. 2015-127903).

However, with the above-described conventional technology (Japanese Patent Application Laid-open No. 2007-286715), it is difficult for a general user to effectively use a free viewpoint image. Specifically, the conventional technology according to the above-described Japanese Patent Application Laid-open No. 2007-286715 requires the use of a marker provided with an identifier or characteristic information. It is difficult for a general user to prepare such a marker and use the marker in image processing. Thus, with the conventional technology according to the above-described Japanese Patent Application Laid-open No. 2007-286715, it is difficult to promote usage of a free viewpoint image, such as easy generation of a free viewpoint image by a general user or presentation of the generated free viewpoint image to a third person.

SUMMARY OF THE INVENTION

It is an object of the present invention to at least partially solve the problems in the conventional technology.

An image processing apparatus according to the present application includes a reception unit that receives image data produced through image capturing by a predetermined image capturing apparatus and including an elliptical figure, and a specification unit that performs projection transform of the image data so that the elliptical figure included in the image data received by the reception unit appears to be an exact circle, and specify, based on characteristic information on the exact circle obtained through the projection transform, the exact circle to be a marker used in predetermined processing on the image data.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 1 is a diagram illustrating exemplary image processing according to a first embodiment;

FIG. 2 is a diagram illustrating an exemplary configuration of an image processing apparatus according to the first embodiment;

FIG. 3 is a diagram illustrating an exemplary image data storing unit according to the first embodiment;

FIG. 4 is a diagram illustrating an exemplary free viewpoint image storing unit according to the first embodiment;

FIG. 15 is a diagram (2) for description of an exemplary marker according to the second embodiment;

DETAILED DESCRIPTION OF THE PREFERRED EMBODIMENTS

Figure 5:
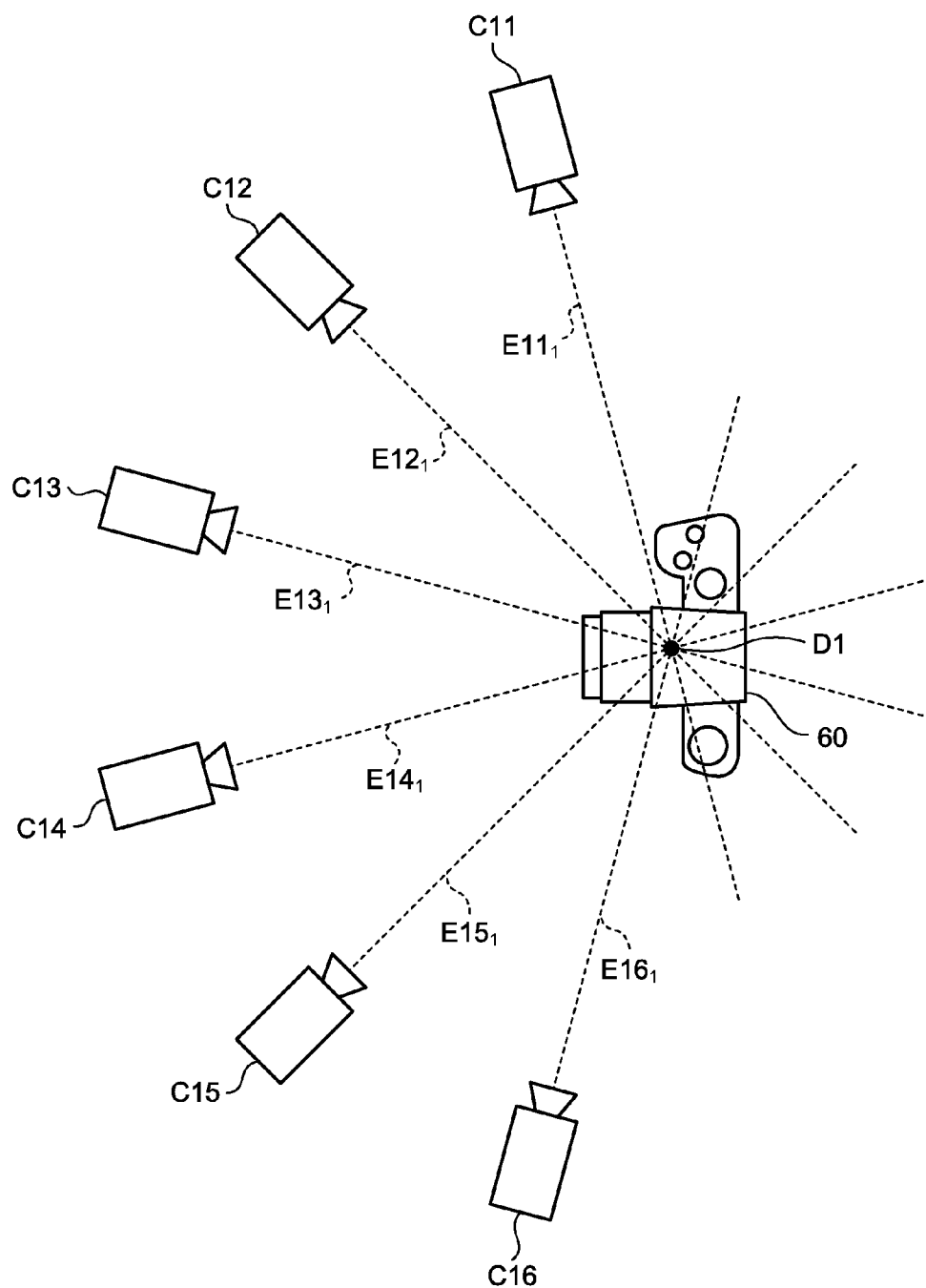
FIG. 5 is a diagram illustrating exemplary ideal arrangement of image capturing apparatuses for a free viewpoint image.

Embodiments of an image processing apparatus, an image processing method, and a non-transitory computer readable storage medium having stored therein an image processing program according to the present application will be described in detail below with reference to the accompanying drawings. These embodiments do not limit the image processing apparatus, the image processing method, and the non-transitory computer readable storage medium having stored therein the image processing program according to the present application. In the following embodiments, any identical parts are denoted by an identical reference sign, and duplicate description thereof will be omitted.

1. First Embodiment

1-1. Exemplary Image Processing

First, exemplary image processing according to a first embodiment will be described with reference to FIG. 1. FIG. 1 is a diagram illustrating the exemplary image processing according to the first embodiment. As illustrated in FIG. 1, an image processing system 1 according to the first embodiment includes a user terminal 10 and an image processing apparatus 100. The user terminal 10 and the image processing apparatus 100 are connected with each other through a network N (for example, the Internet) (not illustrated) to perform communication therebetween. The number of devices included in the image processing system 1 is not limited to the example illustrated in FIG. 1. For example, the image processing system 1 may include a plurality of the user terminals 10.

The user terminal 10 is an information processing device used by a user requesting generation of a free viewpoint image to the image processing apparatus 100. For example, the user terminal 10 is achieved by a desktop personal computer (PC), a laptop PC, a cellular phone such as a smartphone, a personal digital assistant (PDA), or a tablet terminal. In the following, the user means the user terminal 10 in some cases. For example, "distribute a free viewpoint image to the user" means "distribute a free viewpoint image to the user terminal 10 used by the user" in some cases.

In the first embodiment, the user using the user terminal 10 is, for example, a seller that auctions a product owned by the user at an auction site or the like. The user performs image capturing of the product as an object at various angles and acquires a plurality of pieces of image data. Subsequently, the user transmits the pieces of image data to the image processing apparatus 100 through the user terminal 10. Then, the user acquires, from the image processing apparatus 100, a free viewpoint image generated based on the pieces of image data. For example, the user auctions the product at an auction site or the like using the free viewpoint image as one piece of information for description of the product.

The image processing apparatus 100 is a server device configured to generate a free viewpoint image that enables continuous display of an image corresponding to an optional viewpoint position. Specifically, the image processing apparatus 100 according to the first embodiment receives submission of a plurality of pieces of image data from the user that desires distribution of a free viewpoint image, and generates a free viewpoint image from the received pieces of image data. Then, the image processing apparatus 100 distributes the generated free viewpoint image to the user terminal 10.

The image processing apparatus 100 generates a free viewpoint image by performing predetermined conversion processing on original image data submitted by the user terminal 10. The image processing apparatus 100 derives a projection transform matrix to convert a plurality of images captured at multiple viewpoints into a free viewpoint image that is an image as if captured when optical axes of image capturing apparatuses (cameras) intersect with each other at a three-dimensional position. In this case, the image processing apparatus 100 refers to, as parameters of the image capturing apparatus that captures each image, camera parameters including the position and posture of the image capturing apparatus. In other words, strong calibration is desirably performed for the image capturing apparatus when each image data is acquired at generation of a free viewpoint image.

In a known method, a camera parameter is estimated based on captured image data when the camera parameter cannot be specified. However, when image capturing is not performed by using professional-use equipment and facility, the camera parameter cannot be estimated at a high accuracy by the known method, causing failure in generation of a free viewpoint image in some cases. For example, an image for description of a product auctioned at an auction site is often captured by a seller, and the image capturing is not often performed by an image capturing professional or the like. Thus, it is difficult in some cases to highly accurately estimate, by the known method, a camera parameter related to image data from which a free viewpoint image is generated.

To solve this problem, the image processing apparatus 100 according to the first embodiment performs predetermined calibration (camera calibration) on a plurality of pieces of submitted image data by using a visual marker (hereinafter simply referred to as a "marker") included in image data. Each marker includes a figure drawn to allow identification of the marker. When using the marker, the image processing apparatus 100 can perform calibration processing by calculating a rotation angle R and a translation amount T of an image capturing apparatus with respect to the marker in an image. In this manner, the image processing apparatus 100 acquires an appropriate parameter (for example, the projection transform matrix) for the projection transform of an original image to an image to be included in a free viewpoint image. Then, the image processing apparatus 100 joins images subjected to the projection transform to generate a free viewpoint image that allows smooth display shift on a plurality of images. The following describes a process of image processing performed by the image processing apparatus 100.

First, the user prepares image data from which a free viewpoint image is generated. Specifically, the user prepares a plurality of pieces of image data each representing an image including a marker together with an object (step S11). The user can use a circle drawn on a sheet as an exemplary marker. Specifically, the user prepares a sheet 70 provided by the image processing apparatus 100 and including predetermined circles drawn at four corners. For example, the user acquires image data of the sheet 70 through the network N. Then, the user acquires the sheet 70 by printing the image data of the sheet 70 onto a predetermined sheet (for example, A4 size paper).

Circular markers M01, M02, M03, and M04 shaped in circles are drawn on the sheet 70. A circle used as a circular marker is an exact circle (precise circle) in which a distance from an optional point on the circumference to the center is fixed. The image processing apparatus 100 has information on a positional relation (for example, a coordinate relation) among the circular markers M01, M02, M03, and M04 on the sheet 70. Each circular marker is recognized not as one circle but as two concentric circles of an outer circle drawn in black and an inner circle drawn as a white inner part when a circle as its component includes a circumference part.

The circular markers M01, M02, M03, and M04 have different sizes recognizable by the image processing apparatus 100. With this configuration, when image data includes two circular markers, the image processing apparatus 100 can identify the circular markers by checking the sizes of correct circles subjected to the projection transform. Although described later in detail, the image processing apparatus 100 may identify each of the circular markers M01, M02, M03, and M04 by using a ratio of the radii of the outer circle and the inner circle. In this manner, when image data includes one circular marker only, the image processing apparatus 100 can identify the circular marker.

The user places an object 60 at a central part of the sheet 70 and performs image capturing at various angles. For example, the user captures an image of the object 60 by using an image capturing function of the user terminal 10. Alternatively, the user captures an image of the object 60 by using an instrument such as a digital camera capable of acquiring image data by image capturing. Then, the user stores, in the user terminal 10, image data acquired by the image capturing.

In this manner, the user prepares a plurality of pieces of image data obtained through image capturing of the object 60 being placed on the sheet 70. As illustrated in FIG. 1, the user prepares original image data P01, P02, P03, . . . , P0N (N is an optional number) captured at positions surrounding the object 60. In the example illustrated in FIG. 1, original image data P01 is an image captured on a right side of the object 60 when the object 60 is viewed from a front side. Original image data P02 is an image of the object 60 captured on a front-right side. Original image data P03 is an image of the object 60 captured on a front-right side closer to the front side than original image data P02. In this manner, original image data P01 to P0N is image data sequentially captured, for example, at positions semi-circularly surrounding the object 60.

As described above, the circular markers M01, M02, M03, and M04 are drawn on the sheet 70. However, when image capturing is performed on the object 60 being placed on the central part of the sheet 70, one or two circular markers are hidden by the object 60 in many pieces of image data and not included in image data. In the example with original image data P01, P02, and P03 illustrated in FIG. 1, circular marker M04 is hidden by the object 60 and not completely included in image data. In other words, when image capturing is performed on the object 60 being placed on the central part of the sheet 70, two or three circular markers are included in each of many pieces of image data. For example, as illustrated in FIG. 1, original image data P01, P02, and P03 include the circular markers M01, M02, and M03 together with the object 60. Although described later in detail, in the image processing performed by the image processing apparatus 100, the number of markers needed to be included in image data changes depending on the kind of a marker. For example, when a marker included in an image is a circular marker, the image processing apparatus 100 can generate a free viewpoint image from a plurality of pieces of image data of images each including at least two circular markers.

Subsequently, the user terminal 10 submits a plurality of pieces of original image data P01 to P0N to the image processing apparatus 100 in accordance with an operation by the user (step S12). For example, the user terminal 10 submits image data by uploading pieces of original image data P01 to P0N at a web page that provides image generation service provided by the image processing apparatus 100.

The image processing apparatus 100 receives the submission of original image data P01 to P0N each including at least two circular markers together with the object 60. Then, the image processing apparatus 100 generates a free viewpoint image based on the submitted image data (step S13). Specifically, the image processing apparatus 100 performs predetermined calibration on the pieces of submitted image data based on at least two circular markers included in one image data.

Typically, calibration processing on image data using a marker is achieved by calculating the parameters of the rotation angle R and the translation amount T of an image capturing apparatus (camera) having captured this image data with respect to the marker in the image data.

The following describes the calibration processing performed by the image processing apparatus 100 according to the first embodiment in an example with original image data P01. First, the image processing apparatus 100 detects any circular marker in original image data P01. In this example, the image processing apparatus 100 detects the circular markers M01 and M02. The image processing apparatus 100 identifies the circular markers M01 and M02 based on a difference in the ratio of the outer circle and the inner circle between the circular markers M01 and M02. As described above, each circular marker drawn on the sheet 70 is an exact circle. Thus, the circular marker appears as an ellipse in image data acquired through image capturing.

The image processing apparatus 100 estimates a normal of a detected ellipse based on a parameter of the ellipse. Two normals are calculated for one ellipse. Thus, the image processing apparatus 100 can estimate a plane including the circular markers M01 and M02 by combining solutions of a normal calculated from the two circular markers M01 and M02. In addition, the image processing apparatus 100 can estimate a normal of the estimated plane.

The image processing apparatus 100 defines the estimated normal of the plane to be a Y axis of a world coordinate system (coordinate system for indicating the position of an object in space, also referred to as a "global coordinate system") in original image data P01. Then, the image processing apparatus 100 defines a vector connecting the centers of appropriate circles (for example, the circular markers M01 and M02) to be a provisional X axis of the world coordinate system. The image processing apparatus 100 can obtain a relation between the circular marker M01 or M02 in an image and the rotation angle R of an image capturing apparatus based on these pieces of information. The image processing apparatus 100 can calculate a provisional translation amount T by assuming the distance between the center of the circles to be one. The image processing apparatus 100 can determine which circle is detected as an ellipse by obtaining an original magnitude relation between the detected circles using the rotation angle R and the translation amount T as provisional parameters. Then, the image processing apparatus 100 can estimate a correct X axis and the translation amount T based on the position of the detected circle in the world coordinate system because position information on a circle on the sheet 70 is known. Accordingly, the image processing apparatus 100 completes strong calibration.

Then, the image processing apparatus 100 acquires, from the submitted image data, an appropriate parameter for projection transform into an image for generating a free viewpoint image. Then, the image processing apparatus 100 performs projection transform of the image data using the acquired parameter. The image processing apparatus 100 generates a free viewpoint image F01 that allows display of the submitted image data at an optional viewpoint by joining images subjected to the projection transform.

The image processing apparatus 100 distributes the generated free viewpoint image F01 to the user terminal 10 (step S14). As illustrated in FIG. 1, the free viewpoint image F01 includes converted image data RP01 to RP0N into which original image data P01 to P0N is converted. The free viewpoint image F01 allows smooth transition of display of converted image data RP01 to RP0N in accordance with, for example, an operation by the user. As illustrated in FIG. 1, as a result of calibration, the object 60 included in converted image data RP01 to RP0N has the same size as compared with the object 60 included in original image data P01 to P0N.

The user terminal 10 acquires the free viewpoint image F01 distributed by the image processing apparatus 100. The user uses the free viewpoint image F01 as one piece of information for description of a product owned by the user for, for example, auction at an auction site (step S15).

In this manner, the image processing apparatus 100 according to the first embodiment receives the pieces of original image data P01 to P0N that are a plurality of pieces of image data obtained at different viewpoint positions and each including a predetermined parameter and at least two of the identifiable circular markers M01 to M04. Then, the image processing apparatus 100 performs calibration on the received pieces of original image data P01 to P0N based on the parameters included in the respective circular markers. In addition, the image processing apparatus 100 performs predetermined conversion processing on the calibrated pieces of image data to generate the free viewpoint image F01 that allows continuous display of an image corresponding to an optional viewpoint position.

Accordingly, the image processing apparatus 100 according to the first embodiment can provide a free viewpoint image to a user who utilizes the free viewpoint image to promote selling of a commercial product, such as the user of the user terminal 10. In other words, the user can achieve a promotion effect stronger than that achieved with presentation of a normal image by using a free viewpoint image for promotion or the like. The image processing apparatus 100 performs calibration processing using a marker at generation of a free viewpoint image. The image processing apparatus 100 can robustly perform calibration using a marker based on original image data acquired not in an image capturing environment in which a dedicated equipment or device is provided. In other words, the image processing apparatus 100 can generate a free viewpoint image that allows natural display at an optional viewpoint from original image data acquired by an image capturing apparatus for which no strong calibration is performed. Accordingly, the image processing apparatus 100 allows effective use of a free viewpoint image.

1-2. Configuration of Image Processing Apparatus

The following describes the configuration of the image processing apparatus 100 according to the first embodiment with reference to FIG. 2. FIG. 2 is a diagram illustrating an exemplary configuration of the image processing apparatus 100 according to the first embodiment. As illustrated in FIG. 2, the image processing apparatus 100 includes a communication unit 110, a storage unit 120, and a control unit 130.

Communication Unit 110

The communication unit 110 is achieved by, for example, a network interface card (NIC). The communication unit 110 is connected with the network N (not illustrated) in a wired or wireless manner, and communicates information with the user terminal 10.

Storage Unit 120

The storage unit 120 is achieved by, for example, a semiconductor memory element such as a random access memory (RAM) or a flash memory, or a storage device such as a hard disk or an optical disk. As illustrated in FIG. 2, the storage unit 120 includes an image data storing unit 121 and a free viewpoint image storing unit 122.

Image Data Storing Unit 121

The image data storing unit 121 stores therein information on image data submitted by the user terminal 10. FIG. 3 illustrates an exemplary image data storing unit 121 according to the first embodiment. In the example illustrated in FIG. 3, the image data storing unit 121 includes items of "submission ID" and "image data".

The item "submission ID" indicates identification information for identifying submitted image data. Examples of the information indicated by the submission ID include the date and time of the submission, and information for identifying the user terminal 10 from which the image data is submitted.

The item "image data" indicates the submitted image data. As illustrated in FIG. 1, the user terminal 10 submits a plurality of pieces of image data as image data from which a free viewpoint image is generated. The item "image data" stores therein a series of pieces of image data submitted by the user terminal 10 in association. Identification information of continuous numbers such as "P01, P02, P03, P04, P05, . . . " may be provided to the respective pieces of image data. The image processing apparatus 100 recognizes, based on these continuous numbers, the order of images joined in the free viewpoint image.

Specifically, FIG. 3 illustrates that image data "P01, P02, P03, P04, P05, . . . " is submitted as image data from which a free viewpoint image is generated at submission of image data identified by submission ID "A01".

Free Viewpoint Image Storing Unit 122

The free viewpoint image storing unit 122 stores therein information on a free viewpoint image generated by the image processing apparatus 100. FIG. 4 illustrates an exemplary free viewpoint image storing unit 122 according to the first embodiment. In the example illustrated in FIG. 4, the free viewpoint image storing unit 122 includes items of "free viewpoint image ID", "original image data", "calibration data", "converted image data", and "initial display screen".

The item "free viewpoint image ID" indicates identification information on the free viewpoint image. The item "original image data" indicates image data from which the free viewpoint image is generated. A plurality of pieces of original image data are stored for one free viewpoint image because the free viewpoint image is generated from a plurality of pieces of image data.

The item "calibration data" indicates predetermined calibration data (camera calibration) used to generate the free viewpoint image. In FIG. 4, the calibration data is represented by a conceptual sign such as "R01". The calibration data includes various kinds of data that allows the image processing apparatus 100 to appropriately perform projection transform of the original image data to acquire an image to be included in the free viewpoint image. For example, the calibration data includes the rotation angle R and the translation amount T of an image capturing apparatus with respect to a marker. The calibration data may include, as camera parameters of the image capturing apparatus for each image data, the focal length of the image capturing apparatus, and the aspect ratio and skew of an image generated by the image capturing apparatus.

The item "converted image data" indicates an image data to be included in the free viewpoint image. The converted image data is, for example, image data on which projection transform is performed with a parameter calculated through predetermined calibration on the original image data.

The item "initial display screen" indicates an image for initial display of the free viewpoint image. One of the converted pieces of image data is selected as the initial display screen.

Specifically, FIG. 4 illustrates an example in which, for a free viewpoint image identified by free viewpoint image ID "F01", original image data is "P01, P02, P03, P04, P05, . . . ", the calibration data thereof is "R01, R02, R03, R04, R05, . . . ", the converted image data thereof is "RP01, RP02, RP03, RP04, RP05, . . . ", and the initial display screen is "RP03".

Generated free viewpoint images have different rotation centers (gaze points) due to optional selection by the user in some cases. In this case, the free viewpoint image storing unit 122 may store therein information on a gaze point in association with a free viewpoint image ID.

Control Unit 130

The control unit 130 is, for example, a controller achieved by a central processing unit (CPU), a micro processing unit (MPU), or the like executing various computer programs (corresponding to exemplary image processing programs) stored in a storage device in the image processing apparatus 100, using the RAM as a work area. Alternatively, the control unit 130 is a controller achieved by, for example, an integrated circuit such as an application specific integrated circuit (ASIC) or a field programmable gate array (FPGA).

As illustrated in FIG. 2, the control unit 130 includes a reception unit 131, a calibration unit 132, a generation unit 133, and a distribution unit 134, and achieves or executes the functions and advantageous effects of information processing described below. The internal configuration of the control unit 130 is not limited to the configuration illustrated in FIG. 2, but may be any configuration that performs the information processing described later. A connection relation among the processing units included in the control unit 130 is not limited to the connection relation illustrated in FIG. 2, but may be another connection relation.

Reception Unit 131

The reception unit 131 receives a plurality of pieces of image data obtained at different viewpoint positions. Specifically, the reception unit 131 according to the first embodiment receives submission of a plurality of pieces of image data obtained at different viewpoint positions and each including at least one identifiable marker including a predetermined parameter.

As described above, in the image processing performed by the image processing apparatus 100, the number of markers needed to be included in image data changes depending on the kind of a marker. For example, when a marker included in an image is a circular marker, the calibration unit 132 and the generation unit 133 described later can generate a free viewpoint image from a plurality of pieces of image data of images including at least two circular markers. In other words, when a marker is a circular marker, the reception unit 131 receives submission of a plurality of pieces of image data each including at least two identifiable circular markers.

A parameter of a marker used by the image processing apparatus 100 differs depending on the kind of the marker in some cases. For example, in a case of a circular marker, the image processing apparatus 100 uses, as parameters, the length of the diameter of a concentric circle included in the circular marker, and position information on each circular marker on the sheet 70. For example, in a case of a marker including identification information and two pairs of parallel line segments, such as a two-dimensional rectangular code (for example, a QR code (registered trademark)), the image processing apparatus 100 uses the identification information and the two pairs of parallel line segments as parameters. In other words, in a case of a rectangular marker, the image processing apparatus 100 uses two pairs of parallel line segments included in a rectangle as a parameter replacing a normal estimated in the case of a circular marker with.

The reception unit 131 provides a submission ID to the series of pieces of image data, the submission of which has been received, and stores the image data in the image data storing unit 121.

Calibration Unit 132

The calibration unit 132 performs calibration on the pieces of image data received by the reception unit 131 based on a parameter of a marker. Specifically, the calibration unit 132 according to the first embodiment performs predetermined calibration on submitted original image data to calculate a camera parameter used in a transform matrix for conversion into an image to be included in a free viewpoint image. The generation unit 133 described later generates a free viewpoint image by performing predetermined conversion processing on original image data based on a result of the calibration performed by the calibration unit 132.

Figure 6:
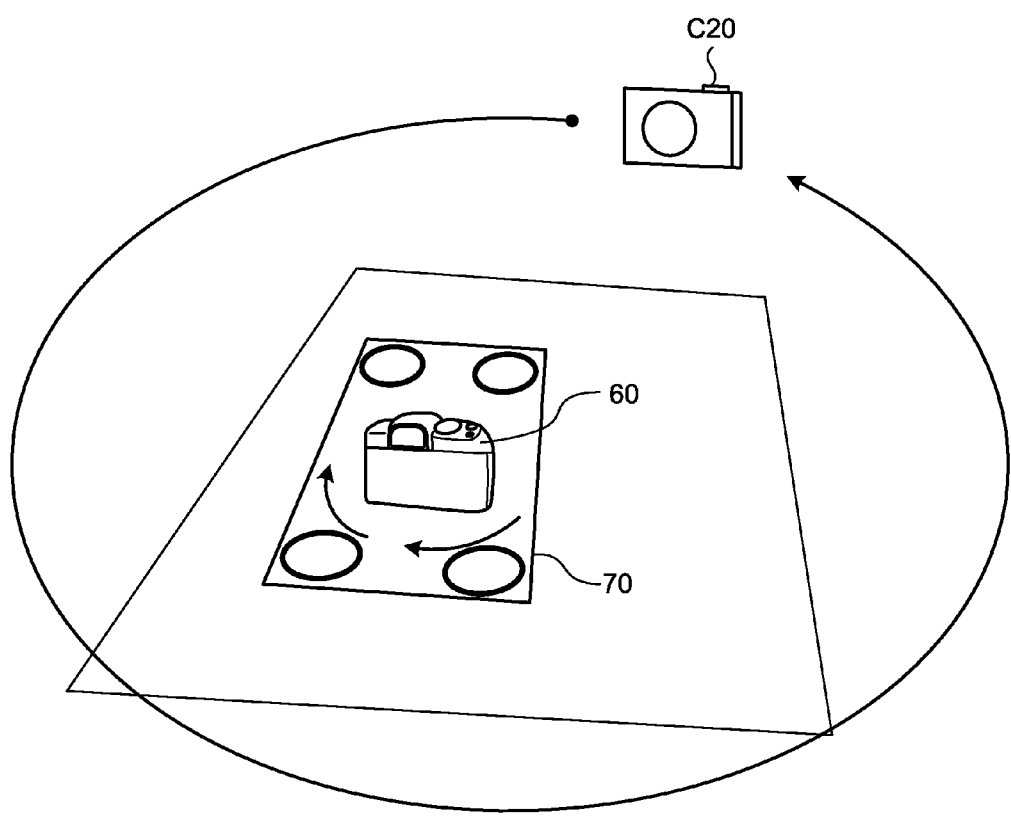
FIG. 6 is a diagram illustrating exemplary image capturing processing for a free viewpoint image according to the first embodiment.
Figure 7:
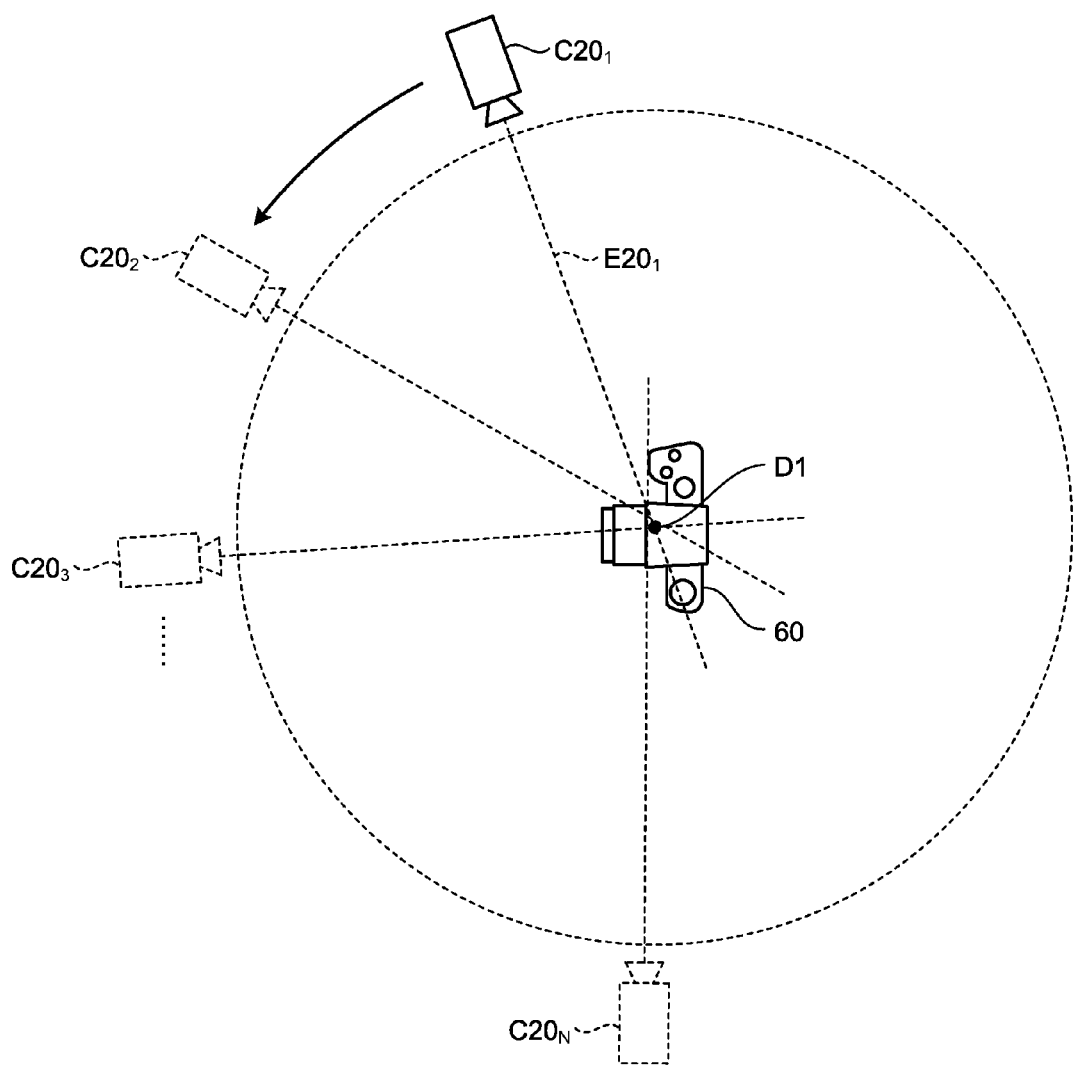
FIG. 7 is a diagram illustrating exemplary arrangement of image capturing apparatuses for a free viewpoint image according to the first embodiment.

The following describes a free viewpoint image handled by the calibration unit 132 and the generation unit 133 with reference to FIGS. 5, 6, and 7. First, arrangement of image capturing apparatuses for a free viewpoint image will be described with reference to FIG. 5. FIG. 5 is a diagram illustrating exemplary ideal arrangement of image capturing apparatuses for a free viewpoint image. FIG. 5 illustrates ideal exemplary arrangement of image capturing apparatuses for image capturing of a plurality of pieces of image data from which a free viewpoint image is generated. FIG. 5 illustrates an example when the object 60 is viewed from top.

In FIG. 5, image capturing apparatuses C11 to C16 are, for example, digital cameras. The image capturing apparatuses C11 to C16 are arranged around the object 60 as an image capturing target such that the optical axis of each image capturing apparatus passes through a predetermined position. In the example illustrated in FIG. 5, the image capturing apparatus C11 is arranged such that the optical axis $E11_1$ thereof passes through a three-dimensional position D1 at the center of the object 60. The image capturing apparatuses C12 to C16 are arranged such that the respective optical axes $E12_1$ to $E16_1$ thereof pass through the three-dimensional position D1. Ideally, the image capturing apparatuses C11 to C16 are each installed such that at least the base of a projection plane thereof is substantially parallel to the ground. Then, the image capturing apparatuses C11 to C16 can acquire image data from which a free viewpoint image of the object 60 is generated by capturing the object 60 at once under the condition illustrated in FIG. 1.

In the example illustrated in FIG. 5, images of the object 60 are captured by using the six image capturing apparatuses C11 to C16, but the number of image capturing apparatuses is not limited to this example. Arrangement positions of the image capturing apparatuses C11 to C16 are not limited to the example illustrated in FIG. 5. For example, instead of the image capturing apparatuses C11 to C16 semi-circularly surrounding the object 60, a plurality of image capturing apparatuses may be arranged at equal intervals on a circle around the object 60.

However, the image capturing method illustrated in FIG. 5 requires appropriate arrangement and calibration of the image capturing apparatuses C11 to C16. In other words, it is difficult for a general user, who is not an image capturing professional, to perform the image capturing processing as illustrated in FIG. 5.

The following describes, with reference to FIGS. 6 and 7, image capturing processing performed when image capturing of the object 60 is performed by a general user or the like (hereinafter simply referred to as a "user"), who is not an image capturing professional. FIG. 6 is a diagram illustrating exemplary image capturing processing for a free viewpoint image according to the first embodiment. FIG. 6 illustrates a situation in which the user captures images of the object 60 placed on the sheet 70 using an image capturing apparatus C20.

As illustrated in FIG. 6, the user continuously captures images of the object 60, rotating around the object 60 placed on the sheet 70. In this case, unlike FIG. 5, the optical axis and focal length of the camera are not fixed between pieces of captured image data.

As described with reference to FIG. 1, in each image data captured by the user around the object 60, any of the circular markers drawn on the sheet 70 is hidden, but at least two circular markers are included.

The following describes, with reference to FIG. 7, a case in which the image capturing situation illustrated in FIG. 6 is viewed from top. FIG. 7 is a diagram illustrating exemplary arrangement of image capturing apparatuses for a free viewpoint image according to the first embodiment. FIG. 7 illustrates, for example, arrangement of image capturing apparatuses assumed when the user captures images of the object 60 at image capturing of a plurality of pieces of image data from which a free viewpoint image is generated. In the following description, image capturing apparatuses $C20_1$ to $C20_N$ are collectively referred to as the "image capturing apparatus C20" when it is unnecessary to distinguish them.

The image capturing apparatuses $C20_1$ to $C20_N$ are, for example, digital cameras. Ideally, as described with reference to FIG. 5, the image capturing apparatuses $C20_1$ to $C20_N$ are desirably arranged around the object 60 as individual image capturing apparatuses. However, in reality, it is assumed that the user captures images of the object 60 while the single image capturing apparatus $C20_1$ is moved to the positions of the image capturing apparatuses $C20_1$ to $C20_N$ illustrated in FIG. 7. Specifically, the user captures an image of the object 60 at the position of the image capturing apparatus $C20_1$ illustrated in FIG. 7. Then, the user moves along a circle having a center at the object 60 to the position of the image capturing apparatus $C20_2$ illustrated in FIG. 7, and captures an image of the object 60. The user repeats this operation to acquire a plurality of pieces of image data of the object 60.

In this case, it is difficult for the user, who is carefully performing image capturing so that an optical axis $E20_1$ passes through the center of the object 60, to accurately (for example, as illustrated in FIG. 5) capture images of the object 60 as images from which a free viewpoint image is generated. In addition, camera calibration is not necessarily performed on the image capturing apparatus C20 handled by the user, and thus, it is unable to acquire a camera parameter or the like from image data in some cases.

For this reason, the calibration unit 132 performs predetermined calibration with a marker on image data received by the reception unit 131 to allow conversion of an image to be included in a free viewpoint image. This will be described below with reference to FIG. 8.

Figure 8:
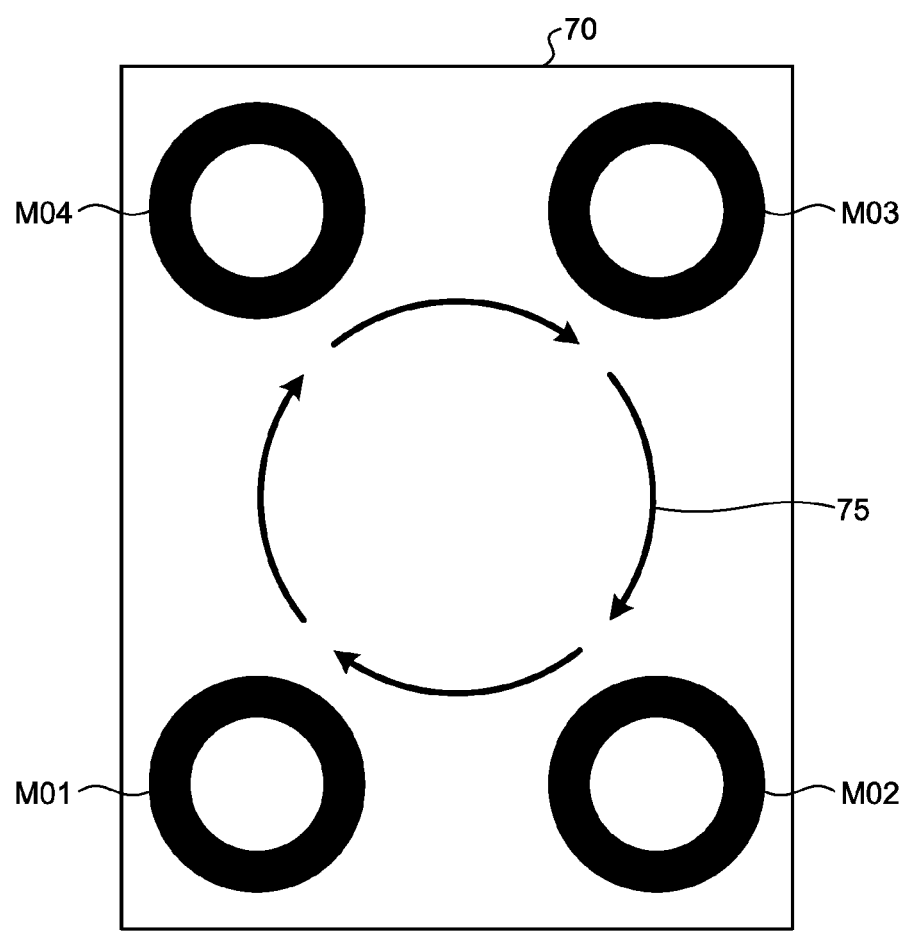
FIG. 8 is a diagram illustrating a marker used by the image processing apparatus according to the first embodiment.

FIG. 8 is a diagram illustrating markers used by the image processing apparatus 100 according to the first embodiment. The following description will be made with reference to FIG. 8 on the sheet 70 on which the circular markers M01, M02, M03, and M04 used by the calibration unit 132 for calibration are drawn at four corners.

As illustrated in FIG. 8, the sheet 70 includes the circular markers M01, M02, M03, and M04 and a central display 75. The central display 75 serves as a guide, for example, when the object 60 is placed on the sheet 70. The user acquires the sheet 70 illustrated in FIG. 8 and captures images of the object 60 placed on the sheet 70.

As described above, the calibration unit 132 acquires, in advance, position information on the circular markers M01, M02, M03, and M04 drawn on the sheet 70. Accordingly, the calibration unit 132 can estimate a positional relation among the circular markers M01, M02, M03, and M04 by identifying each circular marker, and thus can perform calibration processing using the markers. The calibration unit 132 may provide, in advance, position information on a marker in image data as an absolute value in the world coordinate system. In other words, the calibration unit 132 performs mapping processing of mapping a plurality of markers to the world coordinate system in advance. Accordingly, when image data includes a marker hidden by the object 60 or any other object, the calibration unit 132 can estimate the position of the hidden marker to perform calibration processing.

Specifically, the calibration unit 132 performs calibration on a plurality of pieces of image data based on a correspondence relation of position information on each of a plurality of markers as a parameter of the marker. When a marker is a circular marker, the calibration unit 132 performs calibration on a plurality of pieces of image data based on plane information on a plane including the normal of the circular marker estimated by using a parameter of the circular marker, and a correspondence relation of position information on two circular markers included in the plane corresponding to the plane information.

Generation Unit 133

The generation unit 133 performs predetermined conversion processing on the pieces of image data calibrated by the calibration unit 132 to generate a free viewpoint image that allows continuous display of an image corresponding to an optional viewpoint position.

As described with reference to FIG. 7, pieces of original image data submitted by the user terminal 10 are each captured with an optical axis pointing to the object 60, but precisely, it is assumed that the optical axis is shifted vertically and horizontally. Thus, it is estimated that discontinuity is distinguishable in a continuous image obtained by continuously displaying the pieces of submitted original image data in a simple manner.

To avoid this, the generation unit 133 converts each original image data by using a projection transform matrix for conversion into an image as if the optical axis of the image capturing apparatus C20 when the original image data is captured passes through one point (for example, the three-dimensional position D1 illustrated in FIG. 5) in the three-dimensional space. The projection transform matrix can be produced based on a parameter derived through calibration processing performed by the calibration unit 132.

For example, the generation unit 133 generates converted image data to be included in a free viewpoint image through the projection transform. For example, when it is assumed that the predetermined image capturing apparatus (camera) corresponding to the converted image data is a camera k, a projection transform matrix $H_k$ of the camera k can be calculated by Expression (1) below based on the rotation angle (rotation matrix) R of the camera and a three-dimensional point through which the optical axis is expected to pass.

$$H_k = A_k R'_k R_k^{-1} A_k^{-1} \quad (1)$$

In Expression (1) above, the inverse matrix of $R_k$ is an original rotation angle R at the camera k, $R'_k$ is a new rotation angle R, and $A_k$ is an internal parameter. The internal parameter is provided based on, for example, an image central position and a focal length. The new rotation angle $R'_k$ can be calculated from an ideal optical axis obtained by a known method based on a camera position and a center around which rotation is to be performed in the world coordinate system, and an original optical axis.

Figure 9:
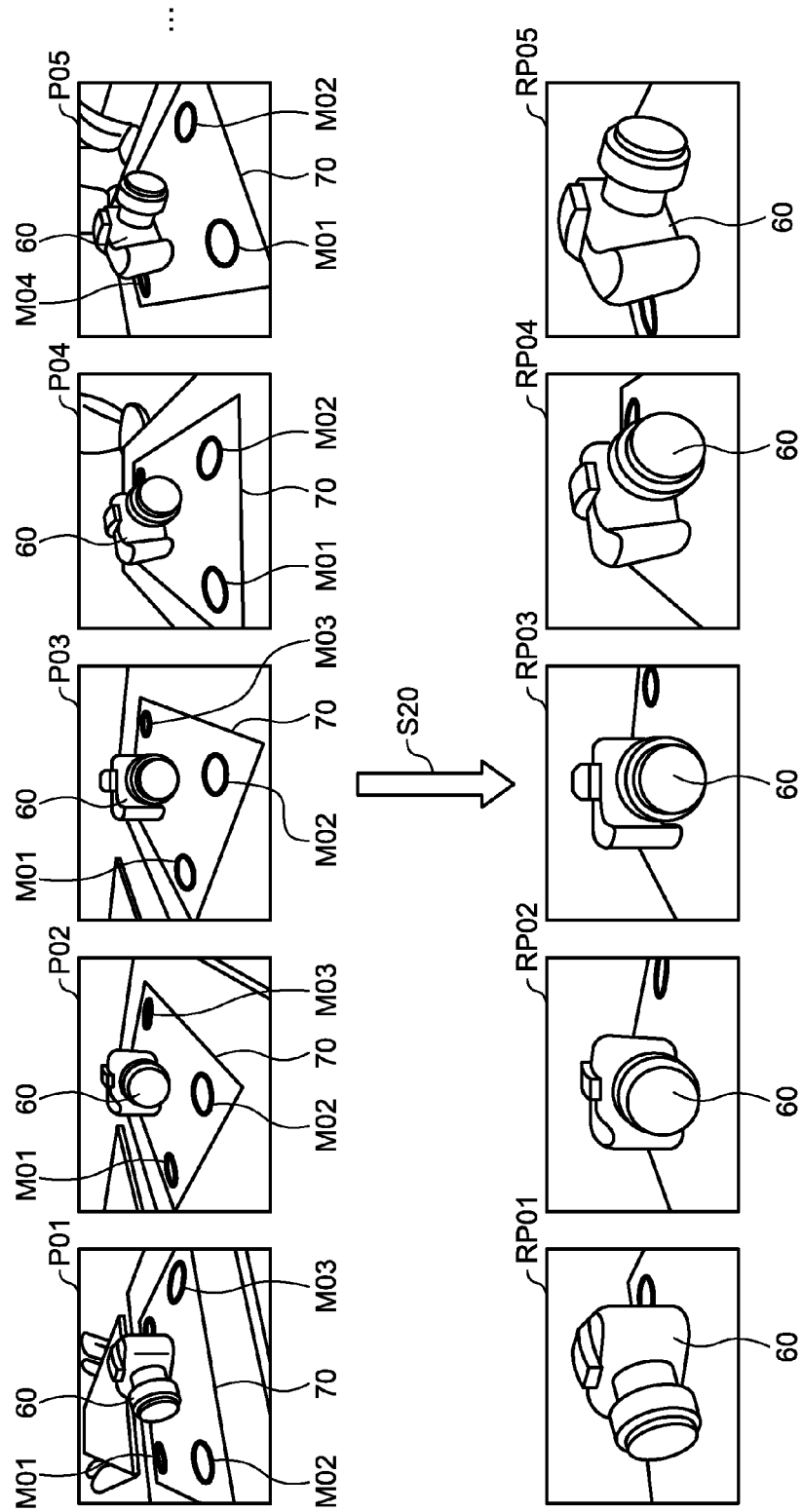
FIG. 9 is a diagram illustrating exemplary generation processing performed by a generation unit according to the first embodiment.

The generation unit 133 generates a free viewpoint image by converting each original image data using the projection transform matrix generated through Expression (1) above. The following describes exemplary generation processing performed by the generation unit 133 according to the first embodiment with reference to FIG. 9. FIG. 9 is a diagram illustrating the exemplary generation processing performed by the generation unit 133 according to the first embodiment.

As illustrated in FIG. 9, the generation unit 133 generates a free viewpoint image by converting original image data P01 to P05 to the converted image data RP01 to RP05 through predetermined conversion processing together with the calibration processing performed by the calibration unit 132.

In an example with original image data P01, the calibration unit 132 detects at least two circular markers from original image data P01. For example, the calibration unit 132 detects the circular marker M02 and the circular marker M03 from original image data P01. Then, the calibration unit 132 performs calibration on original image data P01 through the above-described processing. Specifically, the calibration unit 132 performs calibration processing to derive a camera parameter of the image capturing apparatus C20 having captured original image data P01. In other words, the calibration unit 132 acquires a parameter used to generate a projection transform matrix.

Then, the generation unit 133 receives a result of the calibration processing performed by the calibration unit 132, and generates a projection transform matrix. Subsequently, the generation unit 133 generates converted image data RP01 by performing projection transform of original image data P01. Similarly, the generation unit 133 generates converted image data RP02 to RP05 based on original image data P02 to P05, respectively (step S20).

After calibration processing with a marker, the calibration unit 132 or the generation unit 133 may perform calibration processing or projection transform by various kinds of known methods. For example, the calibration unit 132 or the generation unit 133 may employ a known method called structure from motion (hereinafter referred to as "SFM"). The SFM can restore a three-dimensional shape in an image based on a plurality of pieces of image data captured at various kinds of viewpoint positions. Specifically, the SFM calculates motion of the image capturing apparatus C20 by expressing, in bases, movement of a corresponding point associated between pieces of image data. Position information on the image capturing apparatus C20 can be restored by the SFM, and thus, the calibration unit 132 may acquire a camera parameter by using an SFM method in predetermined processing as appropriate.

As described above, in predetermined calibration processing, the calibration unit 132 acquires a camera parameter (for example, relative position information) of the image capturing apparatus C20 having acquired a plurality of pieces of image data based on a relation among markers each having correspondence among the pieces of image data. Then, the generation unit 133 calculates a projection transform matrix corresponding to each image data using calibration data such as a parameter acquired by the calibration unit 132. Then, the generation unit 133 converts each piece of original image data using the calculated projection transform matrix. Then, the generation unit 133 generates a free viewpoint image based on the converted image data. The generation unit 133 stores the generated free viewpoint image in the free viewpoint image storing unit 122. The processing disclosed in the above-described Japanese Patent Application Laid-open No. 2014-239384 and Japanese Patent Application Laid-open No. 2015-127903 may be performed as the processing executed by the calibration unit 132 and the generation unit 133 as appropriate.

The generation unit 133 may extract image data to be handled in generation processing by determining whether a plurality of pieces of image data have predetermined continuity and generate a free viewpoint image using the extracted image data. In other words, the generation unit 133 extracts image data appropriate for generation of a free viewpoint image from among a plurality of pieces of submitted image data, and generates a free viewpoint image. For example, the generation unit 133 can remove, in the generation processing, wrongly submitted image data, and image data inappropriate for generation of a free viewpoint image from among a plurality of pieces of submitted image data. This processing may be performed, for example, when a marker cannot be detected or a corresponding marker cannot be detected in original image data in calibration processing with a marker. When having failed to generate a free viewpoint image from a plurality of pieces of submitted image data, the generation unit 133 may generate notification data including a reason for the failed generation or information on replacement of image data for enabling generation of a free viewpoint image.

Distribution Unit 134

The distribution unit 134 distributes a free viewpoint image generated by the generation unit 133. Specifically, the distribution unit 134 according to the first embodiment distributes a free viewpoint image generated by the generation unit 133 and stored in the free viewpoint image storing unit 122 to the user terminal 10 from which original image data is submitted.

When having generated, due to inappropriate original image data, notification data indicating failed generation of a free viewpoint image by the generation unit 133, or a request for submission of additional image data for generation of a free viewpoint image, the distribution unit 134 may distribute the notification data to the user terminal 10 from which the original image data is submitted.

1-3. Image Processing Procedure

Figure 10:
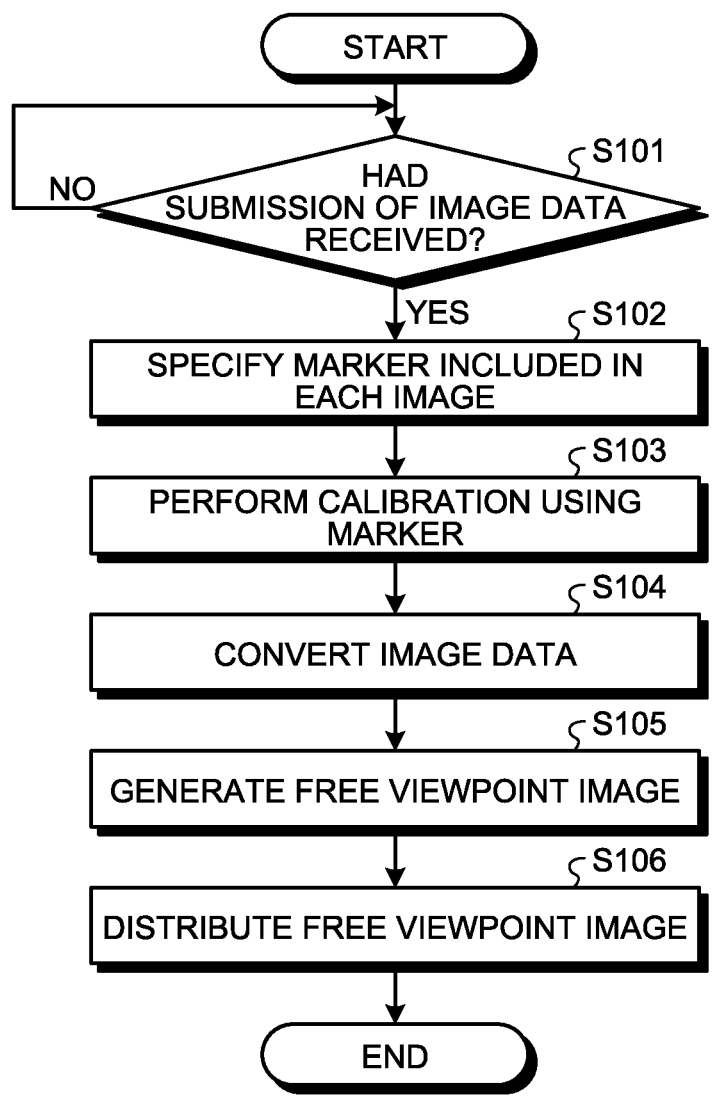
FIG. 10 is a flowchart illustrating an image processing procedure according to the first embodiment.

The following describes, with reference to FIG. 10, a procedure of image processing performed by the image processing apparatus 100 according to the first embodiment. FIG. 10 is a flowchart illustrating image processing procedure according to the first embodiment.

As illustrated in FIG. 10, the reception unit 131 of the image processing apparatus 100 determines whether submission of image data from the user terminal 10 has been received (step S101). If no submission of image data has been received (No at step S101), the reception unit 131 waits for reception of submission of image data.

If submission of image data has been received (Yes at step S101), the reception unit 131 stores the received image data in the image data storing unit 121. Then, the calibration unit 132 specifies (detects) a marker included in each image data (step S102).

Then, the calibration unit 132 performs calibration processing on the image data using the marker (step S103). Subsequently, the generation unit 133 converts the image data based on calibration data of the calibration processing performed by the calibration unit 132 (step S104).

Then, the generation unit 133 generates a free viewpoint image based on the converted image data (step S105). Subsequently, the distribution unit 134 distributes the free viewpoint image to the user terminal 10 (step S106).

1-4. Modifications

The image processing apparatus 100 according to the first embodiment described above may be achieved in various kinds of different configurations in addition to the above-described embodiments. The following describes other embodiments of the above-described image processing apparatus 100.

1-4-1. Marker Using Figure Other than Circle

In the above-described embodiments, the image processing apparatus 100 performs calibration processing on each image data using a circular marker. However, the image processing apparatus 100 may use a marker other than a circular marker.

For example, as described above, the image processing apparatus 100 can use a two-dimensional code including identification information. In this case, the two-dimensional code includes the identification information and two (non-parallel) pairs of parallel line segments, and thus, the image processing apparatus 100 can execute calibration processing when having detected at least one marker from each image data. Any line segments that can define a plane in image data do not need to be parallel to each other in the calibration processing.

Accordingly, the image processing apparatus 100 receives a plurality of pieces of image data each including at least one two-dimensional code as a marker having a rectangular shape and including identification information. Then, the image processing apparatus 100 performs calibration on the pieces of image data based on plane information on a plane estimated using information on line segments as two sides of the two-dimensional code and position information on at least one two-dimensional code included in the plane corresponding to the plane information. In this manner, the image processing apparatus 100 can perform appropriate calibration when a marker used in calibration is a figure other than a circle.

1-4-2. Marker Using Four Points

The image processing apparatus 100 may use four points or more, a positional relation among which is known, as markers. In this case, the image processing apparatus 100 receives submission of image data including at least four points.

Specifically, the image processing apparatus 100 can detect four points as markers in the image data and define two line segments each connecting two points of the four points. With this configuration, the image processing apparatus 100 can perform processing similarly to the processing using a circular marker as described in the above-described embodiments.

Specifically, the image processing apparatus 100 receives a plurality of pieces of image data including a plurality of points, a correspondence relation of position information on which is defined in advance, and at least four of which are included in each image data. Then, the image processing apparatus 100 extracts two line segments from among line segments each connecting two points of the points, and performs calibration on the pieces of image data based on the plane information on a plane estimated using the two extracted line segments and including a plurality of points and a correspondence relation of position information on the points included in the plane corresponding to the plane information. In this manner, when a marker includes no identification information, the image processing apparatus 100 can use each point as a marker by using a correspondence relation of the point based on position information on the point and coordinates thereof.

1-4-3. Exemplary Application (1)

The above-described embodiments exemplarily describe processing performed by the image processing apparatus 100 to generate a free viewpoint image based on a plurality of pieces of image data submitted by a user who desires to submit a product at an auction. In this example, the image processing apparatus 100 may store the generated free viewpoint image in a predetermined storage unit in association with at least one of identification information for identifying the user terminal 10 having submitted a plurality of pieces of image data from which the free viewpoint image is generated or the user using the user terminal 10, and auction information of a service used by the user.

Specifically, the image processing apparatus 100 may not only distribute the generated free viewpoint image to the user, but also store the generated free viewpoint image in, for example, the free viewpoint image storing unit 122 together with identification information (for example, a user ID) on the user terminal 10 or the user, and auction information of a service used by the user. The auction information of the service used by the user is information that allows specification of an auctioned product (assumed to be, for example, an object in original image data of a free viewpoint image) such as identification information indicating the product auctioned at an auction site, identification information for identifying an auction performed at the auction site, or identification information for identifying the product at a shopping site.

In this case, the image processing apparatus 100 receives a request for distribution of a free viewpoint image, from a web server or the like managing the service. Then, having received the request, the image processing apparatus 100 specifies a free viewpoint image based on the identification information on the user terminal 10 or the user and the auction information. Then, the image processing apparatus 100 distributes the specified free viewpoint image to the service (for example, the web server). Having acquired the free viewpoint image, the web server provides the free viewpoint image as an image illustrating the product at the auction.

In this manner, instead of distributing the free viewpoint image to the user, the image processing apparatus 100 may store the free viewpoint image in the storage unit 120 together with information for identifying the user, and distribute the free viewpoint image to the service in response to a request. With this configuration, the image processing apparatus 100 can distribute the free viewpoint image in response to various kinds of requests, and thus achieve more effective use of the free viewpoint image. In this case, the image processing apparatus 100 may store information such as a user ID and an auction information ID of the user in, for example, the free viewpoint image storing unit 122 illustrated in FIG. 4 in association with a free viewpoint image ID.

1-4-4. Exemplary Application (2)

The above-described embodiments describe, for example, auction of a product at an auction site as exemplary usage of a free viewpoint image by a user. However, the image processing apparatus 100 may distribute a generated free viewpoint image to various targets. For example, the image processing apparatus 100 may perform a service of directly distributing a free viewpoint image to, for example, a web server instead of the user terminal 10. The image processing apparatus 100 may also distribute a generated free viewpoint image to a user-generated media (UGM) or consumer-generated media (CGM) as a site providing mainly user-generated contents (UGC). Examples of the UGM include a posted moving image sharing site, a picture sharing site, an illustration posting site, and a social networking service (SNS).

1-5. Advantageous Effects

As described above, the image processing apparatus 100 according to the first embodiment includes the reception unit 131, the calibration unit 132, and the generation unit 133. The reception unit 131 receives a plurality of pieces of image data obtained at different viewpoint positions and each including at least one identifiable marker including a predetermined parameter. The calibration unit 132 performs calibration on the pieces of image data received by the reception unit 131 based on a parameter of the marker. The generation unit 133 performs predetermined conversion processing on the pieces of image data calibrated by the calibration unit 132 to generate a free viewpoint image that allows continuous display of an image corresponding to an optional viewpoint position.

In this manner, the image processing apparatus 100 according to the first embodiment performs calibration processing with a marker at the generation of the free viewpoint image. For example, the image processing apparatus 100 can robustly perform, by using image data in which the marker is captured together with an object, calibration on original image data not acquired in an image capturing environment in which a dedicated equipment or device is provided, but captured by a general user. In other words, the image processing apparatus 100 can generate a free viewpoint image that allows natural display at an optional viewpoint from original image data acquired by an image capturing apparatus on which no strong calibration is performed. As a result, the image processing apparatus 100 allows effective use of a free viewpoint image.

The calibration unit 132 performs calibration on a plurality of pieces of image data based on plane information on a plane estimated using a parameter of a marker and position information on a marker included in the plane corresponding to the plane information in the image data.

In this manner, the image processing apparatus 100 according to the first embodiment performs calibration processing using a marker including a parameter (for example, information defining two line segments) that can be used to define plane information. With this configuration, the image processing apparatus 100 can perform appropriate calibration processing on image data captured by a general user.

The reception unit 131 also receives a plurality of pieces of image data each including a plurality of markers. The calibration unit 132 performs calibration on the pieces of image data based on a correspondence relation of position information on the markers as a parameter.

In this manner, the image processing apparatus 100 according to the first embodiment can perform calibration on the pieces of image data based on the correspondence relation (mapping information) of the position information on the markers in the image data. Accordingly, the image processing apparatus 100 can appropriately specify a corresponding point between the markers, in other words, images, thereby robustly performing calibration.

The reception unit 131 also receives a plurality of pieces of image data each including at least two circular markers each including two concentric circles. The calibration unit 132 performs calibration on the pieces of image data based on plane information on a plane including the normals of the circular markers estimated using parameters of the circular markers, and a correspondence relation of position information on the two circular markers included in the plane corresponding to the plane information.

In this manner, the image processing apparatus 100 according to the first embodiment can perform calibration processing with the circular markers. When projected as image data, a circular marker includes an ellipse parameter and thus, the normal of the circular marker can be estimated. Thus, the image processing apparatus 100 can easily estimate information on a plane based on the normal, and in addition, can estimate the normal of the plane. Accordingly, the image processing apparatus 100 can acquire correspondence with the world coordinate system in image data, and thus perform appropriate calibration processing.

The reception unit 131 also receives a plurality of pieces of image data including a plurality of points, a correspondence relation of position information on which is defined in advance, and at least four of which are included in each image data. The calibration unit 132 extracts two line segments from among line segments each connecting two points of the points, and performs calibration on the pieces of image data based on plane information on a plane estimated using the two extracted line segments and including a plurality of points, and a correspondence relation of position information on a plurality of points included in the plane corresponding to the plane information.

In this manner, the image processing apparatus 100 according to the first embodiment can use at least four points as markers. Thus, the image processing apparatus 100 can perform appropriate calibration processing based on any identifiable information without using a figure such as a circle. In other words, the image processing apparatus 100 can perform highly generalized image processing.

The reception unit 131 also receives a plurality of pieces of image data each including at least one two-dimensional code having a rectangular shape and including identification information. The calibration unit 132 performs calibration on the pieces of image data based on plane information on a plane estimated using information on line segments as two sides of the two-dimensional code, and position information on at least one two-dimensional code included in the plane corresponding to the plane information.

In this manner, the image processing apparatus 100 according to the first embodiment may use the two-dimensional code as a marker. The two-dimensional code includes identification information for identifying the two-dimensional code, and thus is identified based on the single marker without specifying two circles of a circular marker in terms of sizes. Thus, the image processing apparatus 100 can perform calibration processing based on at least one two-dimensional code. In other words, the image processing apparatus 100 can avoid a processing load of calculating a correspondence relation between a plurality of markers.

2. Second Embodiment 2-1. Exemplary Image Processing

The following describes a second embodiment of the present application. The first embodiment above describes processing performed by the image processing apparatus 100 to specify two markers included in image data subjected to projection transform based on, for example, relative sizes and mapping information of the markers. The first embodiment above also describes processing performed by the image processing apparatus 100 to specify a marker based on identification information included in a two-dimensional code, and coordinates information on four points or more.

Figure 11:
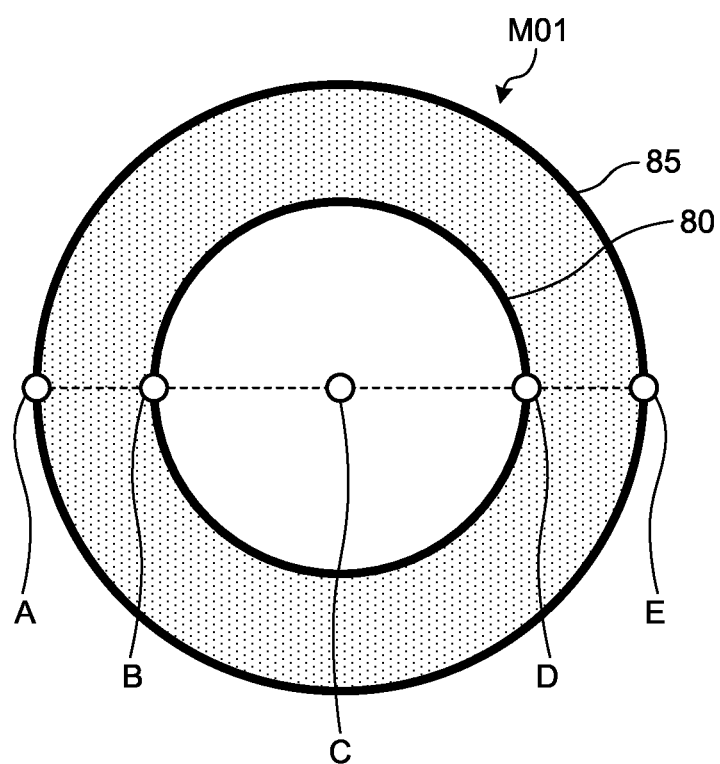
FIG. 11 is a diagram illustrating exemplary image processing according to a second embodiment.

An image processing apparatus 200 (refer to FIG. 12) according to the second embodiment may acquire predetermined characteristic information included in a marker and unchanged through projection transform in advance, and identify the marker based on the acquired characteristic information. Through this processing, the image processing apparatus 200 can identify the marker, in other words, uniquely specify the marker when two markers or more are not included in image data. This will be described with reference to FIG. 11. FIG. 11 is a diagram illustrating exemplary image processing according to the second embodiment. The image processing apparatus 200 according to the second embodiment performs processing the same as that performed by the image processing apparatus 100 according to the first embodiment except for processing of acquiring information on a marker in advance and processing of specifying the marker.

In FIG. 11, the image processing apparatus 200 acquires information on the circular markers M01, M02, M03, and M04 included in the sheet 70 as illustrated in FIG. 8. The image processing apparatus 200 acquires, as the information on the circular markers M01, M02, M03, and M04, the lengths of the diameters of the outer and inner circles of each circular marker, and a ratio derived from the lengths of the diameters of the outer and inner circles. In addition, the image processing apparatus 200 acquires a ratio of ratios derived from the lengths of the diameters of the outer and inner circles, in other words, a cross-ratio of the circular marker.

It is assumed that the circular marker M01 drawn on the sheet 70 and the circular marker M01 in image data produced through image capturing by an image capturing apparatus have different sizes depending on an image capturing condition irrespective of projection transform of the image data. However, when the size of the circular marker changes, a value indicated as a cross-ratio of the diameters of the outer and inner circles is unchanged through the projection transform. In the second embodiment, the image processing apparatus 200 specifies a circular marker by using this property.

FIG. 11 exemplarily illustrates the circular marker M01. In the example illustrated in FIG. 11, the image processing apparatus 200 recognizes the circular marker M01 as two concentric circles of an inner circle 80 and an outer circle 85. In the example illustrated in FIG. 11, point C indicates the center of the inner circle 80 and the outer circle 85, point B and point D indicate intersection points of a straight line passing through the center with the inner circle 80, and point A and point E indicate intersection points of a straight line passing through the center with the outer circle 85. In other words, line BD indicates the diameter of the inner circle 80, and line AE indicates the diameter of the outer circle 85. Line BC or line CD indicates the radius of the inner circle 80, and line AC or line CE indicates the radius of the outer circle 85.

As described above, at specification of each circular marker, the image processing apparatus 200 utilizes a property that a cross-ratio of line segments (ratio of ratios of lengths) is unchanged in a projection space. The image processing apparatus 200 may employ a length between any points among points A to E, which allows acquisition of a ratio of ratios of lengths of the two concentric circles. For example, the image processing apparatus 200 utilizes a property that a ratio of (line AC/line AD) and (line BC/line BD) is unchanged. In other words, the image processing apparatus 200 utilizes a property that the value of (line AC×line BD)/(line AD×line BC) is unchanged.

In this case, the image processing apparatus 200 acquires the sheet 70 as image data in advance, and acquires a length between points in the circular marker M01 to be specified to be a marker. For example, the image processing apparatus 200 acquires the ratio of (line AC/line AD) or (line BC/line BD) as a ratio of the inner circle 80 and the diameter of the outer circle 85. Then, the image processing apparatus 200 registers the value of a cross-ratio as characteristic information calculated for any points of points A to E, in association with a marker ID as identification information provided to the circular marker M01. The image processing apparatus 200 performs the same registration for the circular markers M02, M03, and M04. In this case, it is assumed that the circular markers M01, M02, M03, and M04 drawn on the sheet 70 have a difference therebetween recognizable by the image processing apparatus 200 in lengths between the center thereof and intersection points of a straight line passing through the center with the outer and inner circles. In other words, it is assumed that the image processing apparatus 200 acquires different values between the circular markers for a cross-ratio indicated by line segments between the intersection points and the center.

Then, when having acquired image data including any of the circular markers M01, M02, M03, and M04, the image processing apparatus 200 performs projection transform of this image data to allow the circular marker indicated as an ellipse to be squarely recognized. The projection transform in this case does not need to be performed upon calculation of camera characteristic information common to a plurality of images through calibration processing as described in the first embodiment, but only need to be performed on one image data to simply replace an ellipse with an exact circle. As described in the first embodiment, when a marker is an exact circle, the marker appears to be an ellipse in image data. In other words, when a marker is known to be an exact circle, the image processing apparatus 200 only needs to detect an ellipse in image data and perform projection transform to convert the detected ellipse back into an exact circle.

Then, the image processing apparatus 200 specifies which of the circular markers M01, M02, M03, and M04 the circular marker included in the image data is by checking the cross-ratio of the circular marker included in the image data subjected to projection transform against the cross-ratios of the circular markers acquired in advance. The image processing apparatus 200 performs the above-described processing on, for example, a plurality of pieces of image data received from the user, thereby accurately specifying any marker included in each image data.

As described above, the image processing apparatus 200 according to the second embodiment receives image data produced through image capturing by a predetermined image capturing apparatus and including an elliptical figure. Then, the image processing apparatus 200 performs projection transform of the image data so that the elliptical figure included in the received image data appears to be an exact circle, and specifies the exact circle to be a marker used for predetermined processing of the image data based on characteristic information on the exact circle obtained through the projection transform.

Specifically, the image processing apparatus 200 acquires, as a marker, information on a marker including an inner circle and an outer circle having a common center, and also acquires, as characteristic information, the value of a cross-ratio indicating a ratio of ratios of lengths between the center of the marker and intersection points of a straight line passing through the center with the inner and outer circles. Then, the image processing apparatus 200 specifies the marker included in the image data by checking a cross-ratio of a marker obtained through projection transform of the image data based on points corresponding to points of the acquired cross-ratio against a cross-ratio of a marker acquired in advance.

In this manner, the image processing apparatus 200 according to the second embodiment acquires characteristic information on the marker, which remains unchanged in the image data subjected to projection transform, and specifies the marker by checking the characteristic information. Accordingly, when only one marker is included in original image data, the image processing apparatus 200 can uniquely specify the marker. In other words, the image processing apparatus 200 can specify a marker included in image data without using relative information on two markers. In this manner, the image processing apparatus 200 can accurately perform specification of whether a circular marker included in each image data is the circular marker M01 or the circular marker M02, and thus can accurately find a positional relation between a marker and an object in a plurality of images. Thus, the image processing apparatus 200 can generate a free viewpoint image that does not provide discomfort from a plurality of pieces of original image data, such as image data captured by a general user, on which calibration is not accurately performed. The image processing apparatus 200 can acquire information on a marker such as the sheet 70 in advance, and thus does not require processing that would cause a load on a general user in specification processing of the marker. As a result, the image processing apparatus 200 allows the general user to achieve effective use of the free viewpoint image.

2-2. Configuration of Image Processing Apparatus

Figure 12:
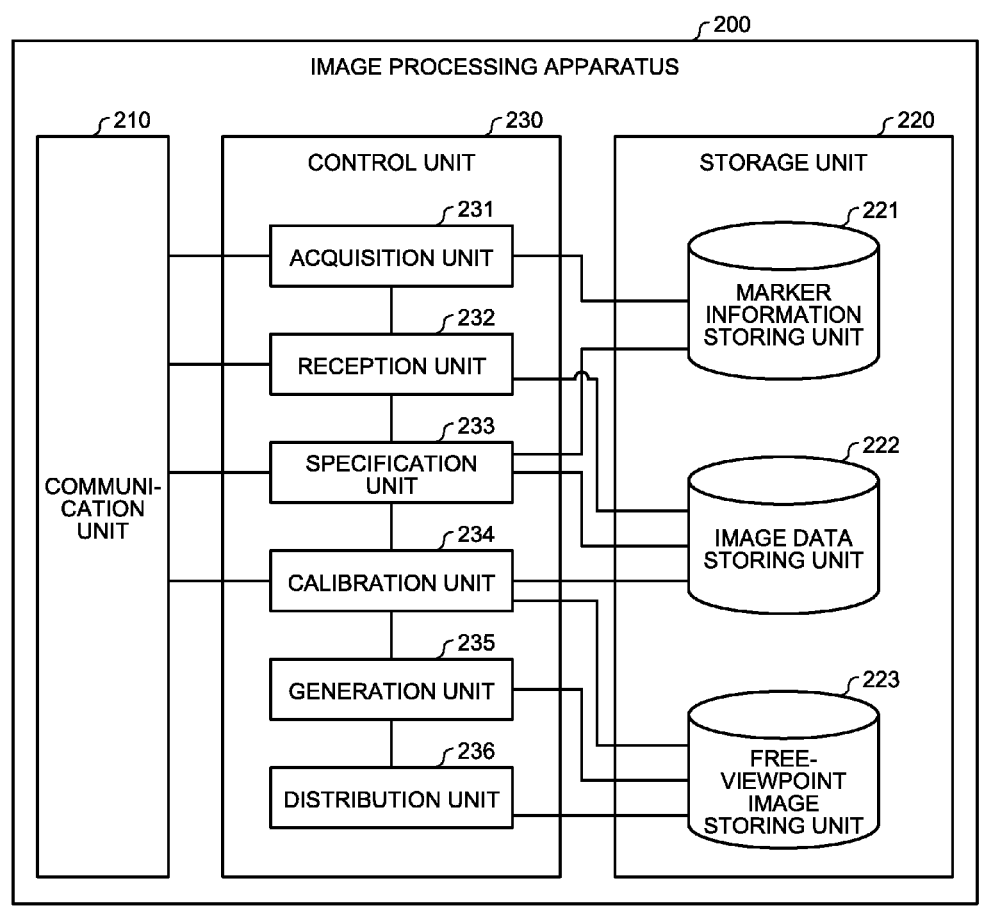
FIG. 12 is a diagram illustrating an exemplary configuration of an image processing apparatus according to the second embodiment.

The following describes the configuration of the image processing apparatus 200 according to the second embodiment with reference to FIG. 12. FIG. 12 is a diagram illustrating an exemplary configuration of the image processing apparatus 200 according to the second embodiment. As illustrated in FIG. 12, the image processing apparatus 200 includes a communication unit 210, a storage unit 220, and a control unit 230. The following omits description of processing the same as the processing performed by the image processing apparatus 100 described in the first embodiment, and any processing unit that performs the same processing.

Marker Information Storing Unit 221

Figures 13, 14:
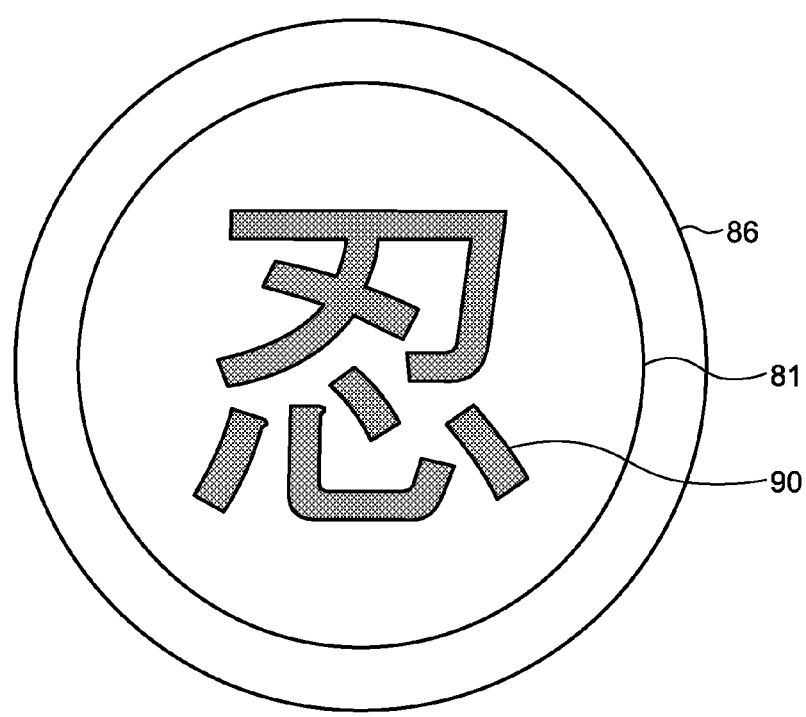
FIG. 13 is a diagram illustrating an exemplary marker information storing unit according to the second embodiment.
FIG. 14 is a diagram (1) for description of an exemplary marker according to the second embodiment.

A marker information storing unit 221 stores therein information on a marker. FIG. 13 illustrates an exemplary marker information storing unit 221 according to the second embodiment. In the example illustrated in FIG. 13, the marker information storing unit 221 includes items of "marker ID" and "characteristic information".

The item "marker ID" indicates identification information for identifying a marker. The item "characteristic information" indicates information used to specify a marker and unchanged through projection transform. In the example illustrated in FIG. 13, the characteristic information is represented by a concept sign such as "L01", but in reality, the item "characteristic information" stores therein, for example, a numerical value for specifying a marker. The characteristic information is, for example, the value of a cross-ratio derived based on ratios of the diameters of two concentric circles.

Specifically, FIG. 13 illustrates that a marker identified by marker ID "M01" includes information of "L01" as the characteristic information.

Control Unit 230

As illustrated in FIG. 12, the control unit 230 includes an acquisition unit 231, a reception unit 232, a specification unit 233, a calibration unit 234, a generation unit 235, and a distribution unit 236, and achieves or executes the functions and advantageous effects of information processing described below. The internal configuration of the control unit 130 is not limited to the configuration illustrated in FIG. 12, but may be any configuration that performs the information processing described later. A connection relation among the processing units included in the control unit 230 is not limited to the connection relation illustrated in FIG. 12, but may be another connection relation.

Acquisition Unit 231

The acquisition unit 231 acquires information on a marker. Specifically, the acquisition unit 231 acquires characteristic information that is information on a marker including a circle as a component and is used to specify the marker. For example, the acquisition unit 231 acquires image data of the circular marker M01 drawn on the sheet 70 provided to the user. Then, the acquisition unit 231 provides the circular marker M01 with a marker ID as identification information, and stores the circular marker M01 in the marker information storing unit 221.

The acquisition unit 231 acquires, as a marker, information on a marker including an inner circle and an outer circle having a common center, and also acquires, as characteristic information, a cross-ratio indicating a ratio of ratios of lengths between the center of the marker and intersection points of a straight line passing through the center with the inner and outer circles. The acquisition unit 231 also acquires a cross-ratio indicated with line segments associating the two circles of the inner and outer circles. In the example illustrated in FIG. 11, the acquisition unit 231 acquires a ratio of line segment AD and line segment AC and a ratio of line segment BC and line segment BD to acquire a cross-ratio, but does not employ line segment AB and line segment DE as line segments for calculation of a cross-ratio.

Reception Unit 232

The reception unit 232 receives image data produced through image capturing by a predetermined image capturing apparatus and including an elliptical figure. For example, the reception unit 232 according to the second embodiment acquires image data obtained through image capturing of the object 60 being placed on the sheet 70 and including at least one of the circular markers M01 to M04. The captured one of the circular markers M01 to M04 appears to be a figure on an ellipse because the circular markers M01 to M04 are exact circles. Accordingly, the image data received by the reception unit 232 includes a figure on an ellipse. The reception unit 232 stores the received image data in an image data storing unit 222.

The reception unit 232 also receives a plurality of pieces of image data obtained at different viewpoint positions and each including at least one figure specified to be a marker. Similarly to the first embodiment, the calibration unit 234 and the generation unit 235 generate a free viewpoint image based on the pieces of image data received by the reception unit 232.

The reception unit 232 also receives submission of a plurality of pieces of image data from the user terminal 10, and information for identifying the user terminal 10. For example, the distribution unit 236 distributes the free viewpoint image generated by the generation unit 235 to the user terminal 10 based on the information for identifying the user terminal 10.

Specification Unit 233

The specification unit 233 performs projection transform of image data received by the reception unit 232 so that any elliptical figure included in the image data appears to be an exact circle, based on characteristic information on the exact circle obtained through the projection transform, and specifies the exact circle to be a marker used for predetermined processing of the image data.

For example, the specification unit 233 specifies a marker included in the image data by checking the characteristic information on an exact circle in the image data subjected to projection transform by the acquisition unit 231 against the characteristic information acquired by the acquisition unit 231. Specifically, when projection transform is performed so that two elliptical figures included in the image data appear to be two concentric exact circles, the specification unit 233 specifies a marker included in the image data by checking a cross-ratio acquired by the acquisition unit 231 against a cross-ratio of the two exact circles calculated by using lengths between points corresponding to points used to calculate the cross-ratio.

The calculation of the cross-ratio of the two exact circles by using lengths between points corresponding to points used to calculate a cross-ratio means calculation of a cross-ratio of the two concentric circles subjected to projection transform by using line segments corresponding to line segments used to calculate a cross-ratio of the circular marker M01. For example, the acquisition unit 231 calculates the value of (line segment AC×line segment BD)/(line segment AD×line segment BC) as the cross-ratio of the circular marker M01 in FIG. 11. This means that the specification unit 233 calculates, for the two concentric circles subjected to projection transform, a cross-ratio calculated by ((a line segment connecting the outer circle and the center)×(the diameter of the inner circle))/((an intersection point of a line segment passing through the center from the outer circle with the inner circle)×(the radius of the inner circle)), corresponding to the cross-ratio of the circular marker M01.

Calibration Unit 234

The calibration unit 234 performs calibration on a plurality of pieces of image data received by the reception unit 232 based on a parameter of a marker. Specifically, the calibration unit 234 according to the second embodiment performs predetermined calibration on submitted original image data to calculate a camera parameter used in a transform matrix for conversion into an image to be included in a free viewpoint image. As described above, in the processing according to the second embodiment, the specification unit 233 can accurately specify a marker included in the pieces of image data, and thus, the calibration unit 234 can perform strong calibration on each image data by using the marker as a corresponding point in the pieces of image data.

Generation Unit 235

The generation unit 235 performs predetermined conversion processing on the pieces of image data calibrated by the calibration unit 234 to generate a free viewpoint image that allows continuous display of an image corresponding to an optional viewpoint position.

Distribution Unit 236

The distribution unit 236 distributes the free viewpoint image generated by the generation unit 235. Specifically, the distribution unit 236 according to the second embodiment distributes a free viewpoint image generated by the generation unit 235 and stored in a free viewpoint image storing unit 223 to the user terminal 10 from which original image data is submitted.

2-3. Modifications

The image processing apparatus 200 according to the second embodiment described above may be achieved in various kinds of different configurations in addition to the above-described embodiments. The following describes other embodiments of the above-described image processing apparatus 200.

2-3-1. Marker Including Pattern

The image processing apparatus 200 may specify a marker by using characteristic information different from a cross-ratio calculated from ratios of the diameters of two circles as characteristic information. For example, the image processing apparatus 200 may specify a marker based on a pattern drawn inside a circular marker. This will be described with reference to FIGS. 14 to 16.

FIG. 14 is a diagram (1) for description of an exemplary marker according to the second embodiment. The following description will be made on a circular marker M10 in FIG. 14 as the exemplary marker according to the second embodiment. As illustrated in FIG. 14, the circular marker M10 includes an inner circle 81, an outer circle 86, and a pattern 90 as components. The pattern 90 is a pattern based on the Chinese character of "忍". The image processing apparatus 200 acquires, as information on the circular marker M10, for example, an exact circle included in the circular marker M10, and pixel data of the circular marker M10.

The following describes, with reference to FIG. 15, a state in which image capturing is performed on the circular marker M10 by an image capturing apparatus. FIG. 15 is a diagram (2) for description of an exemplary marker according to the second embodiment. As illustrated in FIG. 15, the circular marker M10 appears to be an elliptical figure in image data captured by the image capturing apparatus. The image processing apparatus 200 detects the elliptical figure in the image data, and performs projection transform of the detected elliptical figure (step S30). Accordingly, the image processing apparatus 200 acquires the circular marker M10 as an exact circle.

For example, when the pattern 90 of "忍" can be recognized at an angle the same as that in the acquired information on the circular marker M10, the image processing apparatus 200 can easily specify the circular marker M10 in the image data by checking in the pixel data. However, the pattern 90 of the circular marker M10 usually appears to be obliquely tilted in the image data produced by the image capturing apparatus. Thus, when projection transform is performed on the elliptical circular marker M10 in the image data, the pattern 90 of "忍" appears to be obliquely tilted as illustrated in FIG. 15. In this case, the image processing apparatus 200 cannot specify the circular marker M10 by simple checking in the pixel data. In addition, a large processing load is required to rotate all pixel data of the circular marker M10 acquired from the image data so as to allow detection of an angle that matches with that of pixel data of the circular marker M10 acquired in advance.

For these reasons, the image processing apparatus 200 acquires characteristic information on the circular marker M10, which remains unchanged through rotation, and performs specification processing of a marker by using the information. For example, the image processing apparatus 200 specifies a marker by using, as the characteristic information, characteristic information indicated by a luminance difference in a direction outwardly pointing from the center of a circle between pixels on a radial line outwardly extending from the center of the circle.

Specifically, the image processing apparatus 200 provides a plurality of sample points at positions separated by a first predetermined distance from the center of a circle included in a marker. Then, the image processing apparatus 200 acquires, as characteristic information, binary data in which a numerical value obtained by binarizing a luminance difference between each sample point and a point outwardly separated from the sample point by a second predetermined distance is arranged in the number of the sample points. This will be described with reference to FIG. 16.

Figure 16:
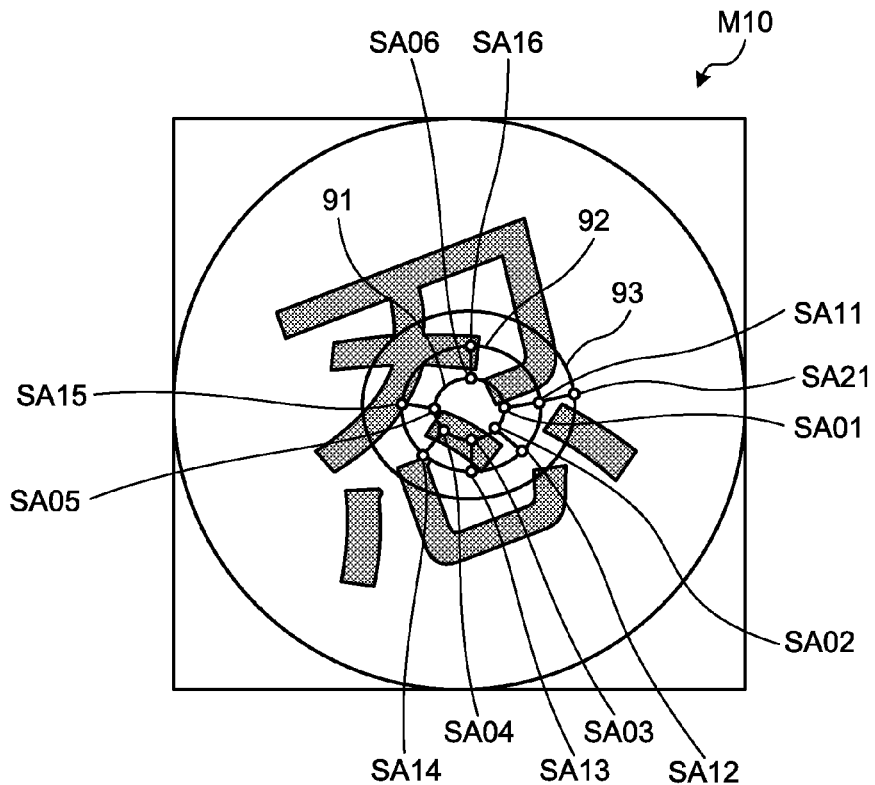
FIG. 16 is a diagram (3) for description of an exemplary marker according to the second embodiment.

FIG. 16 is a diagram (3) for description of an exemplary marker according to the second embodiment. As illustrated in FIG. 16, the image processing apparatus 200 provides, as sample points, pixels at positions separated from the center of the circular marker M10 by the first predetermined distance. In other words, the image processing apparatus 200 provides sample points on a circumference 91 having a radius equal to the first predetermined distance. In the example illustrated in FIG. 16, the image processing apparatus 200 provides sample points SA01 to SA06 on the circumference 91.

Then, the image processing apparatus 200 calculates a difference between a luminance at each of sample points SA01 to SA06 and the luminance of a pixel at positions separated from the sample point on a radial line by the second predetermined distance. In other words, the image processing apparatus 200 calculates a luminance difference between each of sample points SA01 to SA06 and the corresponding one of sample points SA11 to SA16 on a circumference 92 separated from the sample point by the second predetermined distance.

For example, the image processing apparatus 200 acquires a luminance difference between points as one of two values of "0" and "1". For example, when a luminance at sample point SA11 is higher than a luminance at sample point SA01, the image processing apparatus 200 provides the numerical value "1" to sample point SA11. When the luminance at sample point SA11 is lower than the luminance at sample point SA01, the image processing apparatus 200 provides the numerical value "0" to sample point SA11. Similarly, the image processing apparatus 200 provides the numerical value "0" or "1" to each of sample points SA12 to SA16.

Then, the image processing apparatus 200 arranges the numerical values provided to sample points SA11 to SA16 along the circumference 92. In this manner, the image processing apparatus 200 can obtain binary data in which the numerical values of sample points SA11 to SA16 on the circumference 92 are arranged. Specifically, the image processing apparatus 200 acquires enumeration of numerical values such as "00100" and "10100" as binary data for the circumference 92. The image processing apparatus 200 repeats this processing to calculate a luminance difference between an intersection point at which a radial line outwardly extending from each sample points SA01 to SA06 intersects with a circumference 93 and the corresponding one of the previous sample points SA11 to SA16. Accordingly, the image processing apparatus 200 acquires binary data for the circular marker M01. The image processing apparatus 200 is applicable to a case with optionally designed values of the number of sample points and the number of circumferences. For example, the image processing apparatus 200 may acquire a luminance difference between sample point SA11 and sample point SA21 on a circumference assumed outside of sample point SA11. Increase in the number of circumferences and the number of sample points for the image processing apparatus 200 to acquire binarized data leads to improvement in the accuracy of specification processing of the marker.

In this manner, the image processing apparatus 200 acquires binary data as characteristic information on the circular marker M10 in advance. As illustrated in FIG. 16, the image processing apparatus 200 also acquires binary data for the circular marker M10 subjected to projection transform. Then, the image processing apparatus 200 specifies the marker by calculating a similarity between the binary data.

As described above, when image capturing is performed on the circular marker M10, the orientation of the circular marker M10 subjected to projection transform is detected to be different from that of the circular marker M10 as correct data acquired in advance. Thus, the image processing apparatus 200 may use the binary data to produce a histogram indicating a characteristic of the marker.

The image processing apparatus 200 determines bins in the number of virtual circumferences on which sample points are provided in the histogram. Then, the image processing apparatus 200 increases the degree of the corresponding bin by one when binarized data is "1" at any sample point on each circumference, thereby producing the histogram. Having completed inputting of data at each sample point on each circumference, the image processing apparatus 200 normalizes the bins so that the sum of the bins is one.

The image processing apparatus 200 calculates a similarity between the histogram of the circular marker M10 as correct data acquired in advance and the histogram of the circular marker M10 subjected to projection transform by using, for example, Expression (2) below.

$$\text{Similarity} = \sum_{i=1}^{n} \min(input_i, reference_i) \quad (2)$$

In Expression (2) above, "Similarity" indicates the numerical value of a similarity. "$input_i$" indicates the degree of the i-th bin in the circular marker M10 subjected to projection transform. "$reference_i$" indicates the degree of the i-th bin in the circular marker M10 as correct data. "n" indicates the number of bins. "min" provides a smallest value among its arguments.

As expressed in Expression (2) above, when the degree of the i-th bin in the circular marker M10 subjected to projection transform and the degree of the i-th bin in the circular marker M10 as correct data match with each other for all bins, the similarity takes the maximum value "1". The similarity can take the minimum value "0".

As described above, the image processing apparatus 200 calculates the similarity of the marker based on the binary data of the circular marker M10 acquired in advance and the binary data of the circular marker M10 subjected to projection transform. Then, when the similarity exceeds a predetermined threshold, the image processing apparatus 200 specifies an elliptical figure included in the image data to be a figure indicating the circular marker M10.

In this manner, the image processing apparatus 200 can perform processing of specifying the marker by the method of comparing, based on the pattern inside the circle, a luminance difference of the pattern on a radial line. In this method, the image processing apparatus 200 can specify the circular marker as characteristic information that remains unchanged through rotation. In this method, determination on the luminance difference can achieve a more improved accuracy than simple comparison of pixel data of the marker. In other words, the luminance of a pixel of the marker changes in some cases depending on, for example, a camera parameter of an image capturing apparatus and irradiation with illumination light when image capturing is performed. Thus, it is unable to accurately specify the marker through simple comparison between the value of the luminance of the marker in the correct data and the value of the luminance of the marker subjected to projection transform in some cases. However, this method uses, instead of the value of a luminance, data obtained by binarizing a luminance difference, and thus can specify a marker in image data after image capturing at a relatively high accuracy.

The image processing apparatus 200 may employ a method as described below to achieve further improvement in the accuracy of the specification of the marker. For example, when a luminance difference between a sample point and a point outwardly separated from the sample point by the second predetermined distance is binarized, the image processing apparatus 200 may acquire binary data by comparing a luminance averaged over a pixel as the sample point and pixels surrounding the pixel, and a luminance averaged over a pixel as the separated point and pixels surrounding the pixel. In other words, instead of using only the luminance of a pixel (one pixel) extracted as a sample point, the image processing apparatus 200 uses, in processing, for example, an average value of the luminances of several pixels including pixels surrounding this pixel, and an average value of the luminances of several pixels including pixels surrounding a sample point on the next circumference. With this configuration, the image processing apparatus 200 can reduce noise in processing, such as a wrongly sampled anomalous point in image data, thereby achieving an improved accuracy of specification processing.

In addition, the image processing apparatus 200 may employ a method described below to achieve further improvement in the accuracy of the specification of the marker. For example, after the similarity is calculated, the image processing apparatus 200 provides a new sample point at a position shifted by a predetermined angle along an assumed circle (for example, the circumference 91) from the position of a sample point based on which the similarity is calculated, and acquires new binary data based on the new sample point. In addition, the image processing apparatus 200 repeats, a predetermined number of times, calculation of a similarity between binary data included in the circular marker subjected to projection transform and the acquired new binary data. Then, the image processing apparatus 200 may specify the marker included in the image data based on a maximum similarity among the calculated similarities.

As described above, the image processing apparatus 200 provides a sample point as a sample, and after having performed processing of calculating a similarity, provides, as a new sample point, a point at a position shifted by a predetermined angle (for example, two degrees) from the provided sample point to perform processing based on the new sample point. In this manner, the image processing apparatus 200 can reduce error due to distribution of provided sample points, thereby achieving an improved accuracy of specification processing.

The above description is made on the example in which the image processing apparatus 200 assumes virtual circumferences by using the concepts of the first predetermined distance and the second predetermined distance. However, it is assumed that the size of a figure is different between a marker included in image data and a marker acquired in advance. Thus, the image processing apparatus 200 may use, as the first predetermined distance or the second predetermined distance, for example, positions equally dividing the diameter of a largest circle as a component of the marker at a predetermined ratio. For example, the image processing apparatus 200 may equally divide, into 10 line segments, the diameter of a largest circle (in the example with the circular marker M10 illustrated in FIG. 14, the outer circle 86) as a component of the marker, and assume a virtual circumference at a position in ascending order of a distance from the position to the center. When the image processing apparatus 200 performs the above-described specification based on a pattern, a marker does not necessarily need to include two concentric circles as components, but include one circle as a component inside which a pattern is drawn.

2-3-2. Specification of Marker

The second embodiment describes processing in which the image processing apparatus 200 acquires characteristic information on a circular marker, which remains unchanged through rotation, in advance to specify the marker in image data. This processing does not necessarily need to be used to generate a free viewpoint image, but may be simply used as processing of specifying a marker in image data. In other words, for generation of a free viewpoint image, the image processing apparatus 200 may employ the above-described method as processing of specifying not only a marker included in common in a plurality of pieces of image data but also a visual marker in one piece of image data.

2-4 Advantageous Effects

As described above, the image processing apparatus 200 according to the second embodiment includes the reception unit 232 and the specification unit 233. The reception unit 232 receives image data produced through image capturing by a predetermined image capturing apparatus and including an elliptical figure. The specification unit 233 performs projection transform of the image data so that an elliptical figure included in the image data received by the reception unit 232 appears to be an exact circle, and specifies the exact circle to be a marker used for predetermined processing of the image data based on characteristic information on the exact circle obtained through the projection transform.

In this manner, the image processing apparatus 200 according to the second embodiment can uniquely specify, to be a marker, a figure in the image data by using characteristic information that remains unchanged through the projection transform. Accordingly, the image processing apparatus 200 can generate a free viewpoint image that does not provide discomfort from a plurality of pieces of original image data, such as image data captured by a general user, on which calibration is not accurately performed, and thus allows the general user to achieve effective use of the free viewpoint image.

The image processing apparatus 200 according to the second embodiment further includes the acquisition unit 231 configured to acquire characteristic information that is information on a marker including a circle as a component and is used to specify the marker. The specification unit 233 specifies a marker included in the image data by checking characteristic information on an exact circle obtained through the projection transform against the characteristic information acquired by the acquisition unit 231.

In this manner, the image processing apparatus 200 according to the second embodiment acquires information on the marker in advance, and specifies the marker by checking the acquired information against characteristic information on a figure subjected to projection transform. Accordingly, the image processing apparatus 200 can accurately specify a figure used as a marker by the user.

The acquisition unit 231 acquires, as characteristic information on a marker including an inner circle and an outer circle having a common center, a cross-ratio indicating a ratio of ratios of lengths between the center of the marker and intersection points of a straight line passing through the center with the inner and outer circles. When projection transform is performed so that two elliptical figures included in image data appear to be two concentric exact circles, the specification unit 233 specifies a marker included in the image data by checking the cross-ratio acquired by the acquisition unit 231 against a cross-ratio of two exact circles calculated by using lengths between points corresponding to points used to calculate the cross-ratio.

In this manner, the image processing apparatus 200 according to the second embodiment uses a cross-ratio of lengths of two concentric circles as characteristic information that remains unchanged in a projection space. Accordingly, the image processing apparatus 200 can accurately specify the marker in the image data. The image processing apparatus 200 can obtain information for specifying the marker only by changing the lengths of the diameters of the two concentric circles as characteristic information on the marker acquired in advance, thereby easily producing an identifiable marker.

The acquisition unit 231 acquires, as characteristic information on a marker including a predetermined figure drawn in a circle, characteristic information indicated by a luminance difference between pixels at two points on a radial line outwardly extending from the center of the circle. The specification unit 233 specifies a marker included in image data by checking characteristic information on an exact circle obtained through the projection transform against the characteristic information acquired by the acquisition unit 231.

In this manner, in specification processing, the image processing apparatus 200 according to the second embodiment uses the luminance difference between pixels on the radial line instead of using the luminance of a pixel of the marker. Accordingly, the image processing apparatus 200 can perform highly accurate specification processing that is unlikely to be affected by, for example, a camera parameter of an image capturing apparatus and the state of illumination at image capturing.

The acquisition unit 231 provides a plurality of sample points at positions separated from the center of a circle included in a marker by the first predetermined distance, and acquires, as characteristic information, binary data in which a numerical value obtained by binarizing a luminance difference between each sample point and a point outwardly separated from the sample point by the second predetermined distance is arranged in the number of the sample points. The specification unit 233 executes, on the exact circle obtained through the projection transform, processing similarly to processing of the acquisition of the binary data to calculate binary data included in an exact circle obtained through the projection transform, and specifies a marker included in image data by calculating a similarity between the binary data included in the exact circle obtained through the projection transform and the binary data acquired by the acquisition unit 231.

In this manner, the image processing apparatus 200 according to the second embodiment specifies a marker by calculating a similarity between binary data of the marker as correct data and binary data of a figure subjected to projection transform. Accordingly, the image processing apparatus 200 can accurately specify the marker without performing processing that requires a large load, such as comparison of all pixel data of the marker.

When a luminance difference between a sample point and a point outwardly separated from the sample point by the second predetermined distance is binarized, the acquisition unit 231 acquires binary data by comparing a luminance averaged over a pixel as the sample point and pixels surrounding the pixel, and a luminance averaged over a pixel as the separated point and pixels surrounding the separated pixel.

In this manner, the image processing apparatus 200 according to the second embodiment can reduce noise in processing, such as a wrongly sampled anomalous point in image data, thereby achieving an improved accuracy of specification processing.

After the similarity is calculated by the specification unit 233, the acquisition unit 231 provides a new sample point at a position shifted by a predetermined angle along a circle from the position of a sample point based on which the similarity is calculated, and acquires new binary data based on the new sample point. The specification unit 233 repeats, a predetermined number of times, calculation of a similarity between binary data included in an exact circle obtained through the projection transform and the new binary data acquired by the acquisition unit 231, and specifies a marker included in the image data based on a maximum similarity among the calculated similarity.

In this manner, the image processing apparatus 200 according to the second embodiment may employ this method of calculating the similarity several times at shifted sample points. Accordingly, the image processing apparatus 200 can reduce error due to distribution of provided sample points, thereby achieving an improved accuracy of specification processing.

The image processing apparatus 200 according to the second embodiment further includes the calibration unit 234 configured to perform calibration on image data based on a parameter of a marker, and the generation unit 235 configured to perform predetermined conversion processing on the image data calibrated by the calibration unit 234 to generate a free viewpoint image that allows continuous display of an image corresponding to an optional viewpoint position. In this case, the reception unit 232 receives a plurality of pieces of image data obtained at different viewpoint positions and each including at least one figure specified to be a marker. The calibration unit 234 performs calibration on the pieces of image data received by the reception unit 232. The generation unit 235 generates a free viewpoint image by performing predetermined conversion processing on the pieces of image data calibrated by the calibration unit 234.

In this manner, the image processing apparatus 200 according to the second embodiment performs calibration processing using a specified marker to generate a free viewpoint image. Accordingly, the image processing apparatus 200 can generate a free viewpoint image that allows natural display at an optional viewpoint from original image data acquired by an image capturing apparatus on which strong calibration is not performed.

The image processing apparatus 200 according to the second embodiment further includes the distribution unit 236 configured to distribute the free viewpoint image generated by the generation unit 235. The reception unit 232 receives submission of a plurality of pieces of image data from the user terminal 10 and information for identifying the user terminal 10. The distribution unit 236 distributes the free viewpoint image to the user terminal 10 based on the information for identifying the user terminal 10 received by the reception unit 232.

In this manner, the image processing apparatus 200 according to the second embodiment distributes the generated free viewpoint image to the user terminal 10 used by the user. Accordingly, the image processing apparatus 200 can promote the use of the free viewpoint image by a general user.

The generation unit 235 stores the generated free viewpoint image in a predetermined storage unit in association with at least one of identification information for identifying the user terminal 10 having submitted a plurality of pieces of image data from which the free viewpoint image is generated or the user using the user terminal 10, and auction information of a service used by the user.

In this manner, the image processing apparatus 200 according to the second embodiment stores the information for identifying the user and the free viewpoint image in the storage unit 220. Then, the image processing apparatus 200 may distribute the free viewpoint image to the service, for example, in response to a request. Accordingly, the image processing apparatus 200 enables the use of the free viewpoint image in response to various kinds of requests, and thus achieves more effective use of the free viewpoint image by the user.

3. Change of Configuration

Among the pieces of processing described in the above-described embodiments, all or some pieces of processing described as automatically performed processing may be manually performed, or all or some pieces of processing described as manually performed processing may be automatically performed by the well-known method. In addition, information including processing procedures, specific names, and various kinds of data and parameters described in the above specification and drawings may be optionally changed unless otherwise stated. For example, various pieces of information described with reference to the drawings are not limited to information illustrated in the drawings.

Components of devices illustrated in the drawings represent conceptual functions and are not necessarily physically configured as illustrated in the drawings. In other words, specific configurations of distribution and integration of the devices are not limited to the illustrated configurations. All or some of the devices may be functionally or physically distributed and integrated in optional units depending on various loads and use conditions. For example, the calibration unit 132 and the generation unit 133 illustrated in FIG. 2 may be integrated. The image processing apparatus 100 (including the image processing apparatus 200; this notation applies in the following) may be separated into a front-end server configured to mainly perform communication of data with a user, and a back-end server configured to perform, for example, generation processing. In this case, the front-end server includes at least the reception unit 131 and the distribution unit 134. The back-end server includes at least the calibration unit 132 and the generation unit 133. The image processing apparatus 100 may use an external storage server instead of the storage unit 120 provided in the image processing apparatus 100.

The embodiments described above may be combined as appropriate, while maintaining consistency of processing contents.

4. Hardware Configuration

Figure 17:
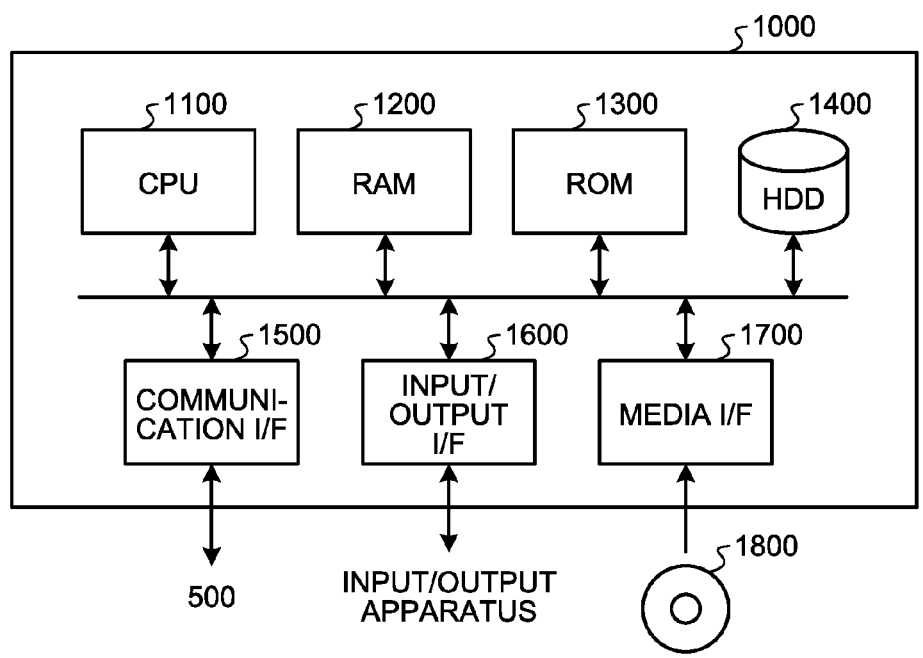
FIG. 17 is a hardware configuration diagram illustrating an exemplary computer configured to achieve functions of an image processing apparatus.

The image processing apparatus according to the embodiments described above is achieved by, for example, a computer 1000 having a configuration as illustrated in FIG. 17. The following describes an example with the image processing apparatus 100. FIG. 17 is a hardware configuration diagram illustrating an exemplary computer 1000 configured to achieve functions of the image processing apparatus 100. The computer 1000 includes a CPU 1100, a RAM 1200, a ROM 1300, an HDD 1400, a communication interface (I/F) 1500, an input/output I/F 1600, and a media I/F 1700.

The CPU 1100 operates based on a computer program stored in the ROM 1300 or the HDD 1400, and controls each component. The ROM 1300 stores therein, for example, a boot program executed by the CPU 1100 at activation of the computer 1000, and a computer program dependent on the hardware of the computer 1000.

The HDD 1400 stores therein, for example, a computer program executed by the CPU 1100 and data used by the computer program. The communication I/F 1500 receives data from another instrument through a communication network 500 (corresponding to the network N in the embodiments) and feeds the data to the CPU 1100, and transmits data generated by the CPU 1100 to another instrument through the communication network 500.

The CPU 1100 controls an output device such as a display or a printer, and an input device such as a keyboard or a mouse through the input/output I/F 1600. The CPU 1100 acquires data from the input device through the input/output I/F 1600. The CPU 1100 outputs generated data to the output device through the input/output I/F 1600.

The media I/F 1700 reads a computer program or data stored in a recording medium 1800, and provides the computer program or the data to the CPU 1100 through the RAM 1200. The CPU 1100 loads the computer program onto the RAM 1200 from the recording medium 1800 through the media I/F 1700, and executes the loaded computer program. The recording medium 1800 is, for example, an optical recording medium such as a digital versatile disc (DVD) or a phase change rewritable disk (PD), a magneto-optical recording medium such as a magneto-optical disk (MO), a tape medium, a magnetic recording medium, or a semiconductor memory.

For example, when the computer 1000 functions as the image processing apparatus 100, the CPU 1100 of the computer 1000 achieves a function of the control unit 130 by executing a computer program loaded onto the RAM 1200. The HDD 1400 stores therein data in the storage unit 120. The CPU 1100 of the computer 1000 reads the computer program from the recording medium 1800 and executes the computer program, but may acquire the computer program, for example, from another device through the communication network 500.

5. Others

The image processing apparatus 100 described above may be achieved by a plurality of server computers, or may be achieved by calling, for example, an external platform through an application programming interface (API) or network computing, depending on a function, and thus the configuration of the image processing apparatus 100 can be flexibly changed.

Any "means" in the claims may be replaced with a "unit" or a "circuit". For example, a generation means may be replaced with a generation unit or a generation circuit.

An image processing apparatus as according to aspect of an embodiment allows effective use of a free viewpoint image.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus comprising:
    a memory storing a position of each of a plurality of markers located on a plane of a sheet; and
    a processor operatively coupled to the memory, the processor being programmed to:
        receive a plurality of images each captured by a camera at a different viewpoint positions relative to an object captured in the plurality of images, each of the plurality of images including image data that includes at least two markers each in a shape of an elliptical illustrated in each of the plurality of images;
        calibrate each of the plurality of images by calculating a camera parameter, the camera parameter being calculated by: (i) identifying the at least two markers in each image of the plurality of images, (ii) determining a normal axis of each of the at least two markers, (iii) determining a plane of the at least two markers based on the determined normal axis of each of the at least two markers, and (iv) comparing the plane of the at least two markers to the stored position of each of the at least two markers;
        based on the calculated camera parameter, convert the image data of each of the plurality of images into a data set in which an optical axis of each camera capturing each of the plurality of images is a same axis; and
        generate a viewpoint image based on combining the converted image data of the plurality of images, and distribute to viewpoint image to a terminal device.

2. The image processing apparatus according to claim 1, wherein the processor is programmed to:
    acquire characteristic information that is information on each of the plurality of markers including a circle as a component that is used to specify the one marker, and
    identify the at least two marker images by checking the characteristic information.

3. The image processing apparatus according to claim 2, wherein the processor is programmed to:
    acquire, as characteristic information on at least one marker of the plurality of markers including an inner circle and an outer circle having a common center, a cross-ratio indicating a ratio of ratios of lengths between the center of the at least one marker and intersection points of a straight line passing through the center with the inner and outer circles, and
    identify, when projection transform is performed so that two elliptical figures included in the image data appear to be two concentric exact circles, the at least two markers included in the image data by checking the acquired cross-ratio against a cross-ratio of the two exact circles calculated by using lengths between points corresponding to points used to calculate the cross-ratio.

4. The image processing apparatus according to claim 2, wherein the processor is programmed to:
    acquire, as additional characteristic information on each of the plurality of markers including a predetermined figure drawn inside the circle, a luminance difference between pixels at two predetermined points on a radial line outwardly extending from the center of the circle, and
    identify the at least two markers included in the image data by checking characteristic information on an exact circle obtained through the projection transform against the acquired additional characteristic information.

5. The image processing apparatus according to claim 4, wherein the processor is programmed to:
    provide a plurality of sample points at positions separated from the center of a circle included in each of the plurality of markers by a first predetermined distance,
    acquire, as the characteristic information, binary data in which a numerical value obtained by binarizing a luminance difference between each of the sample points and a point outwardly separated from the sample point by a second predetermined distance is arranged in the number of the sample points, and
    calculate binary data included in an exact circle obtained through projection transform by executing, on the exact circle obtained through projection transform, processing similar to processing of the acquisition of the binary data, and identify the at least two markers included in the image data by calculating a similarity between the binary data included in the exact circle obtained through projection transform and the acquired binary data.

6. The image processing apparatus according to claim 5, wherein the processor is programmed to acquire, when a luminance difference between the sample point and a point outwardly separated from the sample point by a second predetermined distance is binarized, the binary data by comparing a luminance averaged over a pixel as the sample point and pixels surrounding the pixel and a luminance averaged over a pixel as the separated point and pixels surrounding the separated pixel.

7. The image processing apparatus according to claim 5, wherein the processor is programmed to:
    provide, after calculating the similarity, a new sample point at a position shifted by a predetermined angle along the circle from the position of a sample point based on which the similarity is calculated,
    acquire new binary data based on the new sample point,
    repeat, a predetermined number of times, calculation of a similarity between binary data included in an exact circle obtained through the projection transform and the acquired new binary data, and identify the at least two markers included in the image data based on a maximum similarity among the calculated similarity.

8. The image processing apparatus according to claim 1, wherein the processor is programmed to:

perform predetermined conversion processing on the calibrated image data to generate the free viewpoint image that allows continuous display of an image corresponding to an optional viewpoint position.

9. The image processing apparatus according to claim 8, wherein the processor is programmed to:

receive submission of the plurality of images from the terminal device and information for identifying the terminal device, and distribute the free viewpoint image to the terminal device based on the received information for identifying the terminal device.

10. The image processing apparatus according to claim 8, wherein the processor is programmed to store the generated free viewpoint image in the memory in association with at least one of (i) identification information for identifying the terminal device or a user using the terminal device, and (ii) auction information of a service used by the user.

11. An image processing method executed by a computer, the image processing method comprising:

receiving a plurality of images each captured by a camera at a different viewpoint positions relative to an object captured in the plurality of the images, each of the plurality of images including image data that includes at least two markers each in a shape of an elliptical illustrated in each of the plurality of images;

calibrating each of the plurality of images by calculating a camera parameter, the camera parameter being calculated by: (i) identifying the at least two markers in each image of the plurality of images, (ii) determining a normal axis of each of the at least two markers, (iii) determining a plane of the at least two markers based on the determined normal axis of each of the at least two markers, and (iv) comparing the plane of the at least two markers to a stored position of each of the at least two markers;

based on the calculated camera parameter, converting the image data of each of the plurality of images into a data set in which an optical axis of each camera capturing each of the plurality of images is a same axis; and generating a viewpoint image based on combining the converted image data of the plurality of images, and distribute to viewpoint image to a terminal device.

12. A non-transitory computer readable storage medium having stored therein an image processing program causing a computer to execute a process comprising:

receiving a plurality of images each captured by a camera at a different viewpoint positions relative to an object captured in the plurality of the images, each of the plurality of images including image data that includes at least two markers each in a shape of an elliptical illustrated in each of the plurality of images;

calibrating each of the plurality of images by calculating a camera parameter, the camera parameter being calculated by: (i) identifying the at least two markers in each image of the plurality of images, (ii) determining a normal axis of each of the at least two markers, (iii) determining a plane of the at least two markers based on the determined normal axis of each of the at least two markers, and (iv) comparing the plane of the at least two markers to a stored position of each of the at least two markers;

based on the calculated camera parameter, converting the image data of each of the plurality of images into a data set in which an optical axis of each camera capturing each of the plurality of images is a same axis; and generating a viewpoint image based on combining the converted image data of the plurality of images, and distribute to viewpoint image to a terminal device.

* * * * *